United States Patent
Takeuchi

[11] Patent Number: 5,973,813
[45] Date of Patent: Oct. 26, 1999

[54] REFLECTION TYPE OPTICAL SCANNING SYSTEM

[75] Inventor: Shuichi Takeuchi, Saitama, Japan

[73] Assignee: Asahi Kogaku Kogyo Kabushiki Kaisha, Tokyo, Japan

[21] Appl. No.: 09/095,939

[22] Filed: Jun. 12, 1998

[30] Foreign Application Priority Data

Jun. 13, 1997 [JP] Japan ..................................... 9-157129
Jun. 13, 1997 [JP] Japan ..................................... 9-157130

[51] Int. Cl.⁶ ..................................................... G02B 26/08
[52] U.S. Cl. .......................... 359/207; 359/205; 359/208; 359/216
[58] Field of Search ..................................... 359/207–208, 359/216–219, 662, 711, 708, 718

[56] References Cited

U.S. PATENT DOCUMENTS

| | | |
|---|---|---|
| 4,823,002 | 4/1989 | Saito . |
| 5,130,840 | 7/1992 | Iima . |
| 5,162,938 | 11/1992 | Iima . |
| 5,453,870 | 9/1995 | Iima . |
| 5,504,613 | 4/1996 | Itabashi et al. ............................ 359/208 |
| 5,648,865 | 7/1997 | Iizuka . |
| 5,748,354 | 5/1998 | Iizuka . |
| 5,777,774 | 7/1998 | Iizuka ...................................... 359/208 |
| 5,831,758 | 11/1998 | Sakai et al. ............................ 359/208 |

FOREIGN PATENT DOCUMENTS 8-68957  3/1996  Japan .

*Primary Examiner*—James Phan
*Attorney, Agent, or Firm*—Greenblum & Bernstein, P.L.C.

[57] ABSTRACT

A reflection type optical scanning system includes a cylindrical lens having positive power in the sub-scanning direction, a deflector, an image forming curved reflection mirror, and an anamorphic lens between the curved reflection mirror and an object surface to be scanned and having at least one toroidal surface with positive power in the sub-scanning direction, along a light path in this order from a light source side. The deflector is arranged so that light emitted from the cylindrical lens is made incident thereupon at a predetermined incident angle in the sub-scanning direction. The curved reflection mirror is made of a barrel-shaped toroidal surface, a cross-sectional in the main scanning direction being a concave arc having a single center of curvature or an arc and a cross-sectional shape in the sub-scanning direction being an arc having a single center of curvature, with respect to the incident light. The position of the center of curvature varies depending on the image height in the main scanning direction. The curved reflection mirror is inclined so that the light incident thereupon from the deflector is reflected by the curved reflection mirror in the sub-scanning direction at a predetermined angle toward the object surface. The axis of the anamorphic lens is deviated from the optical axis of the optical scanning system in the sub-scanning direction.

14 Claims, 39 Drawing Sheets

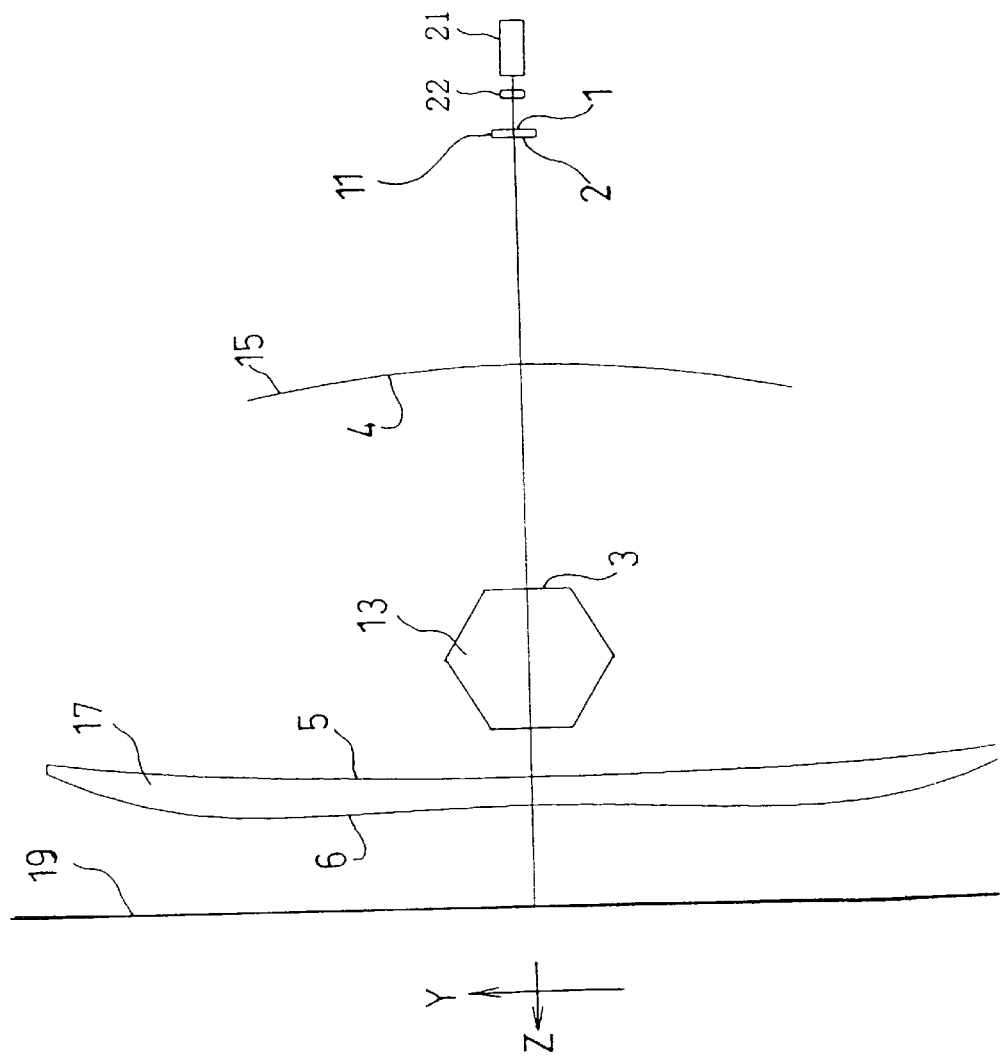

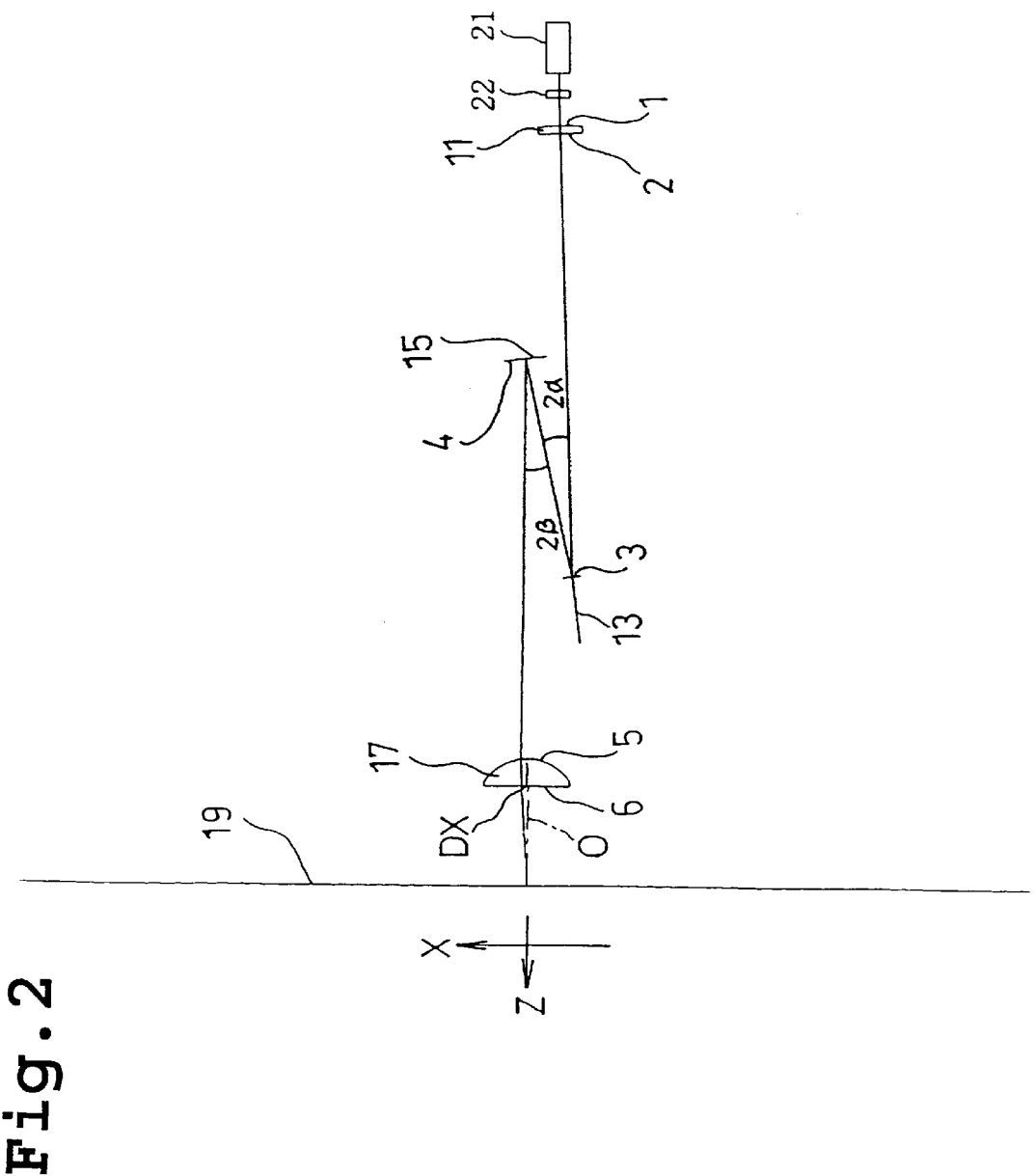

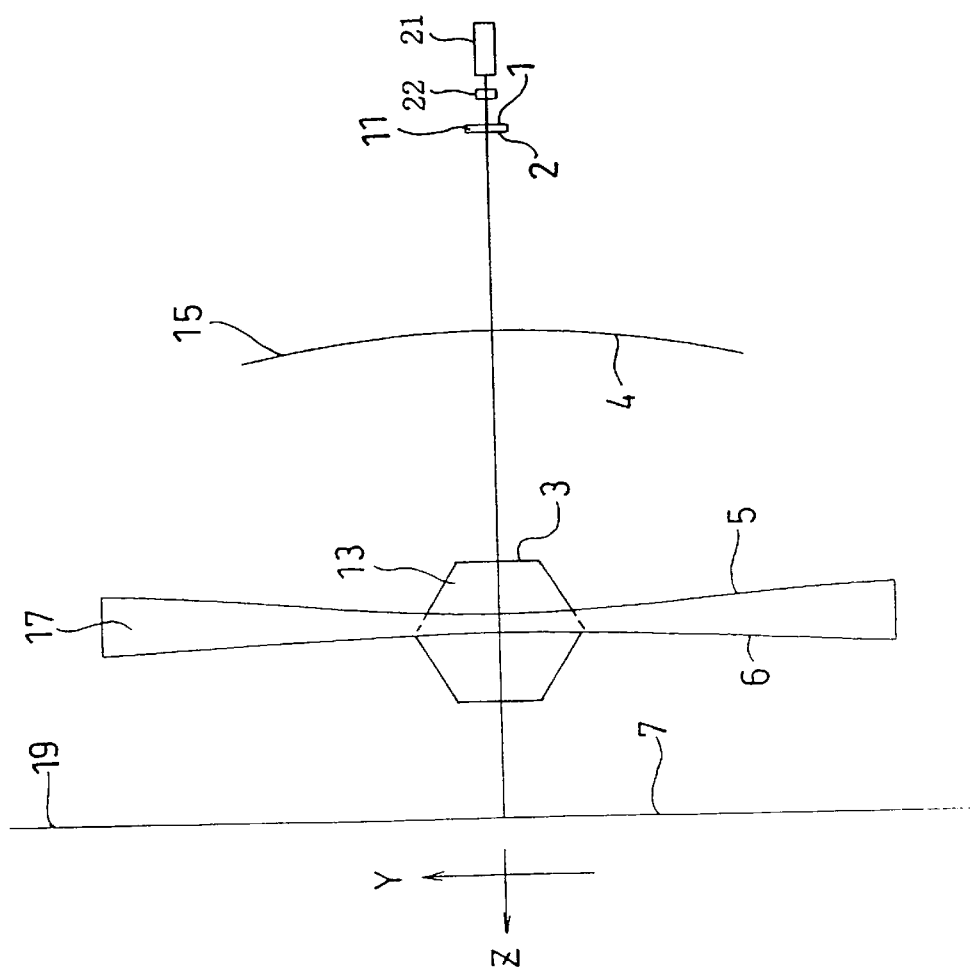

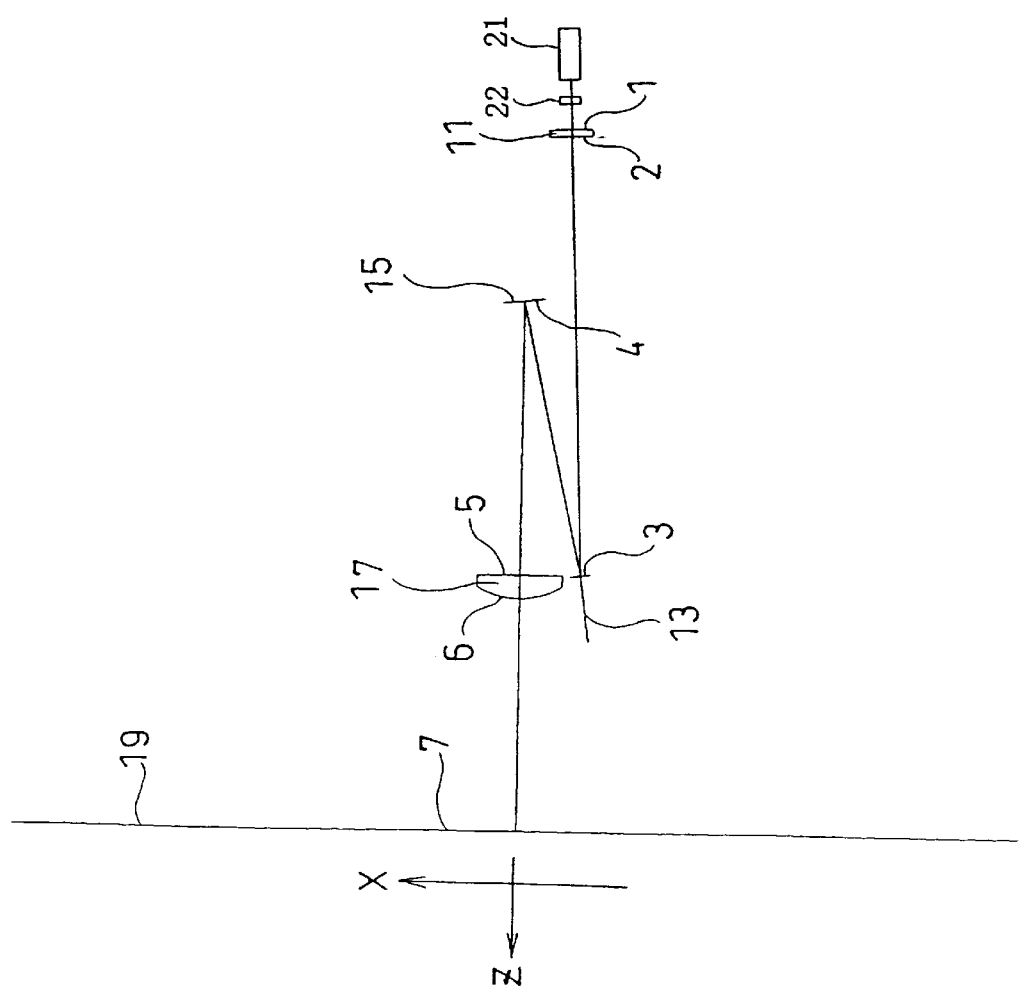

REFLECTION TYPE OPTICAL SCANNING SYSTEM

BACKGROUND OF THE INVENTION

1. Field of the Invention

The present invention relates to an optical scanning system for a laser printer, or the like.

2. Description of the Related Art

In typical optical scanning systems of the related art, a polygonal mirror, which deflects light emitted from a light source; and a scanning lens, an fθ lens which converges the light reflected by the polygonal mirror onto an image surface to scan the same at a constant speed; are provided.

However, in general, the fθ lens is made of a plurality of lenses of a complex shape having toric lens surfaces, hence being difficult to accurately produce the fθ lens. If a lens made of a plastic material which can be easily machined is used, the plastic material must have good transparent properties, hence, limiting the selection of materials which can be used. Consequently, a reflection type optical scanning system has been recently proposed in which a reflection mirror with a curved surface is employed for constant speed scanning, in place of an fθ lens.

In an optical system using a curved reflector (a curved mirror), it is necessary to provide a half mirror to split incident light from a deflector and emission light from the curved reflector. However, the quantity of light which can be transmitted is reduced by the half mirror. Moreover, in the optical system, the curved reflector must be inclined with respect to the optical axis in the sub-scanning direction. Consequently, a bow (curvature of the scanning lines) is caused.

To eliminate the bow which is caused by the inclination of the curved reflector in the sub-scanning direction, the light is made incident upon the deflector at a predetermined incident angle in the sub-scanning direction.

Recently, a multiple beam scanning system has been proposed in which beams which are spaced in the main scanning direction and the sub-scanning direction are simultaneously moved to carry out a high-speed drawing operation. In such a multiple beam scanning system, it is preferable that the distance between the scanning lines be kept constant. However, there is a possibility that the distance between the scanning lines will vary depending on the image height in the sub-scanning direction. The difference in the curvature between the scanning lines is referred to as a differential bow. The differential bow leads to an irregular or uneven drawing or reduces the drawing efficiency. The differential bow is produced, for example, when the magnification in the sub-scanning direction varies depending on the image height in the main-scanning direction.

A reflection type optical scanning system is disclosed in, for example, Japanese Unexamined Patent Publication No. 8-68957. In this scanning system, the curved reflector is inclined in the sub-scanning direction with respect to the optical axis to split the incident light and the emission light. The light is made incident upon a polygonal mirror at a predetermined incident angle in the sub-scanning direction, so that the curvature of the scanning line caused by the curved reflector can be compensated. Other aberrations can be also effectively corrected. However, the f-number in the sub-scanning direction decreases as the image height in the main scanning direction increases. Consequently, the spot diameter on the surface to be scanned varies and a differential bow is still produced.

In order to eliminate the differential bow produced due to the curved reflector being inclined in the sub-scanning direction, the light rays are made incident on the curved reflector at an incline in the sub-scanning direction. Moreover, due to the correction of surface-tilt of the deflector, the incident light rays become image lines. The scanning line of the light rays reflected from the deflector bend in the sub-scanning direction. Since the image line also inclines, distortion of the wave surface (skew distortion) of the light rays occurs.

SUMMARY OF THE INVENTION

It is an object of the present invention to provide a reflection type optical scanning system in which the diameter of the scanning beam spot is uniform over the entire scanning region and little or no differential bow is produced in the multiple beam scanning optical system.

Another object of the present invention is to provide a reflection type optical scanning system in which skew distortion of the wavefront at a wide angle scanning can be eliminated without deviating the anamorphic lens from the optical axis.

The f-number in the sub-scanning direction varies in accordance with an increase in the image height in the main scanning direction, as mentioned above. This is because the magnification in the sub-scanning direction in the portion of the optical system located behind the deflector varies. Consequently, the scanning line having a image height in the sub-scanning direction is bent in the sub-scanning direction on the surface to be scanned in accordance with the change in the magnification in the sub-scanning direction. Thus, a differential bow occurs.

To eliminate these problems, according to the present invention, there is provided a reflection type optical scanning system which includes: a cylindrical lens having positive power in the sub-scanning direction, a deflector, a curved reflection mirror, and an anamorphic lens which is provided between the curved reflection mirror and an object surface to be scanned and which is provided with at least one toroidal surface having positive power in the sub-scanning direction; along a light path in this order from a light source side. The deflector is arranged so that light emitted from the cylindrical lens is made incident thereupon at a predetermined incident angle in the sub-scanning direction; the curved reflection mirror constitutes a deformed barrel-shaped toroidal surface, the shape thereof in a main scanning direction perpendicular to the sub-scanning direction being concave and the shape thereof in the sub-scanning direction being an arc, wherein the centers of curvature of said arc follow a curved locus. The curved reflection mirror is inclined so that the light incident thereupon from the deflector is reflected by the curved reflection mirror at a predetermined angle in the sub-scanning direction toward the object surface to be scanned.

Preferably, the axis of the anamorphic lens is deviated from the optical axis of the optical scanning system in the sub-scanning direction.

Preferably, the optical scanning system satisfies the following formula (1):

$$-0.0002 < (Ce - Cc)/W < 0.0001 \qquad (1)$$

wherein $Cc$ and $Ce$ ($mm^{-1}$) represent the curvatures, in the sub-scanning direction, of the curved reflection mirror at a position where the light rays travelling toward the center of the object surface and the ends of the object surface are incident thereupon, respectively, and W represents the half angle of view (°).

Preferably, the optical scanning system satisfies the following formula (2):

$$2Ze/h_y^2 < -0.4(Ce-Cc) \quad (2)$$
$$0 < (Ce-Cc)/W$$

wherein $h_y$ (mm) represents the image height in the main scanning direction at a position at which the light travelling toward the end of the object surface to be scanned is made incident upon the at least one toroidal surface of the anamorphic lens, and Ze (mm) represents the amount of sag of at least one toroidal surface of the anamorphic lens, respectively. Preferably, the surface of the anamorphic lens located adjacent the curved reflection mirror is defined by a toroidal surface having positive power in the sub-scanning direction.

Alternatively, the optical scanning system satisfies the following formula (3):

$$2Ze/h_y^2 > -0.4(Ce-Cc) \quad (3)$$
$$0 > (Ce-Cc)/W$$

wherein $h_y$ (mm) represents the image height in the main scanning direction at a position at which the light toward the end of the object surface to be scanned is made incident upon the toroidal surface, which has positive power in the sub-scanning direction, of the anamorphic lens, and Ze (mm) represents the amount of sag of the toroidal surface, respectively. Preferably, the surface of said anamorphic lens located adjacent said object surface to be scanned is defined by a toroidal surface which has positive power in said sub-scanning direction.

Preferably, at least one surface of the anamorphic lens is defined by a deformed barrel-shaped toroidal surface whose centers of curvature in the sub-scanning direction follow a curved locus.

According to another aspect of the present invention there is provided a reflection type optical scanning system which includes: a cylindrical lens having positive power in a sub-scanning direction, a deflector, a curved reflection mirror, and an anamorphic lens which is provided with at least one toroidal surface having positive power in the sub-scanning direction; along a light path in this order from the light source side, wherein the deflector is arranged so that light incident thereupon has a predetermined incident angle in the sub-scanning direction.

The curved reflection mirror has an anamorphic reflection surface which is concave, in a main scanning direction perpendicular to the sub-scanning direction, and convex in the sub-scanning direction, with respect to the incident light; the curved reflection mirror is inclined so that the light incident thereupon from the deflector is reflected by the curved reflection mirror direction at a predetermined angle in the sub-scanning toward an object surface to be scanned. The anamorphic lens is arranged without being deviated from the optical axis of the optical scanning system in the sub-scanning direction.

Preferably, the anamorphic surface of the curved reflection mirror is a barrel-shaped toroidal surface which has a rotation axis parallel to the main scanning direction.

Preferably, the anamorphic surface of the curved reflection mirror constitutes a deformed barrel-shaped toroidal surface of which the centers of the curvature thereof in the sub-scanning direction follow a curved locus.

Preferably, the optical scanning system of this embodiment satisfies the following formula (4):

$$-0.0002 < (Ce-Cc)/W < 0.0001 \quad (4)$$

wherein Cc and Ce (mm$^{-1}$) represent the curvatures, in the sub-scanning direction, of the curved reflection mirror at a position where the light rays travelling toward the center and the ends of the object surface to be scanned are incident upon the curved reflection mirror, respectively, and W represents the half angle of view (°).

Preferably, the surface on the curved reflection mirror side of the anamorphic lens is a toroidal surface having positive power in the sub-scanning direction; and wherein the following formula (5) is satisfied:

$$2Ze/h_y^2 < -0.4(Ce-Cc) \quad (5)$$

and $$0 < (Ce-Cc)/W$$

wherein $h_y$ (mm) represents the image height in the main scanning direction at a position at which the light toward the end of the object surface to be scanned is made incident upon the toroidal surface of the anamorphic lens, and Ze (mm) represents the amount of sag of the toroidal surface, respectively.

Alternatively, the surface on the object surface side of said anamorphic lens is a toroidal surface having positive power in the sub-scanning direction; and wherein the following formula (6) is satisfied:

$$2Ze/h_y^2 > -0.4(Ce-Cc) \quad (3)$$
$$0 > (Ce-Cc)/W$$

wherein $h_y$ (mm) represents the image height in the main scanning direction at a position at which the light toward the end of the object surface to be scanned is made incident upon the toroidal surface of the anamorphic lens, and Ze (mm) represents the amount of sag of the toroidal surface, respectively.

Preferably, at least one surface of the anamorphic lens is defined by a deformed barrel-shaped toroidal surface whose center of curvature in the sub-scanning direction follow a curved locus.

The present disclosure relates to subject matter contained in Japanese Patent Application No.09-157129 (filed on Jun. 13, 1997) and Japanese Patent Application No. 09-157130 (filed on Jun. 13, 1997) which are expressly incorporated herein by reference in their entireties.

BRIEF DESCRIPTION OF THE DRAWINGS

The invention will be described below in detail with reference to the accompanying drawings, in which;

FIG. 1 is a diagram showing a reflection type optical scanning system of the first embodiment in the main scanning plane, according to the first aspect of the present invention;

FIG. 2 is a diagram showing a reflection type optical scanning system of the first embodiment in the sub-scanning plane;

FIG. 21 is a diagram showing a reflection type optical scanning system of the sixth embodiment in the main scanning plane, according to the second aspect of the present invention;

FIG. 34 is a diagram showing a reflection type optical scanning system of the ninth embodiment in the sub-scanning plane;

DESCRIPTION OF THE PREFERRED EMBODIMENT

Figure 3A:
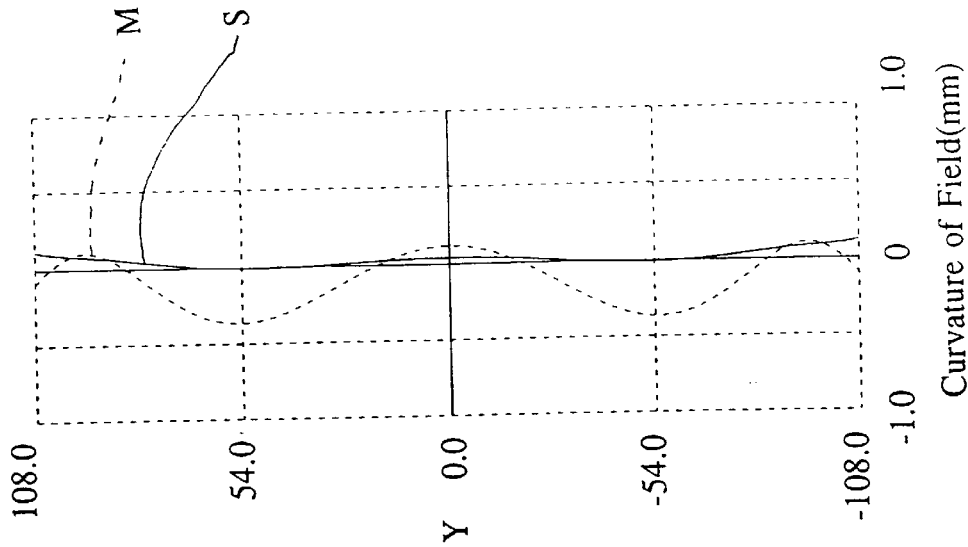
FIGS. 3A and 3B are graphs showing an fθ characteristic error of a scanning line and a curvature of the field, in the first embodiment, respectively.

In the first to fifth embodiments, the laser beam emitted from a laser source 21 is collimated via collimator 22, is transmitted through a cylindrical lens 11 which only has power in the sub-scanning direction; is made incident upon a polygonal mirror (deflector) 13 at a predetermined incident angle; is reflected by the polygonal mirror 13 at a predetermined reflection angle, is reflected by the curved mirror 15 which is inclined in the sub-scanning direction with respect to the optical axis of the optical scanning system, toward an object surface (photosensitive body) 19 to be scanned, at a predetermined reflection angle; is transmitted through an anamorphic lens 17; and is made incident upon the object surface 19 to form a beam spot thereon. The laser beam is deflected along the object surface 19 in the direction Y (main scanning direction) in FIG. 1. Furthermore, the optical axis Z of the scanning system is defined by the light path of the principal ray when the deflection angle produced by the polygonal mirror 13 in the main scanning direction is zero. Also, when the deflection angle is zero, the image height Y is zero (Y=0). According to the first to fifth embodiments, the optical axis of the anamorphic lens 17 is deviated from the optical axis Z of the scanning system in the sub-scanning direction.

The polygonal mirror 13 is rotated about a rotation axis and is provided on the peripheral surface thereof with a plurality of reflection surfaces. The rotation axis of the polygonal mirror 13 is inclined at a predetermined angle in the sub-scanning plane with respect to the incident light. The optical axis O of the anamorphic lens 17 is parallel with and spaced from the optical axis Z of the scanning system by a predetermined distance in the sub-scanning direction. The basic arrangement of the optical elements mentioned above is identical in the five embodiments (of the first aspect of the invention).

In the first aspect of the invention, the reflection surface 4 of the curved mirror 15 is a deformed barrel shaped toroidal surface which is concave where the light rays are incident on and exit in the main scanning direction in cross-section. The cross-sectional shape of the reflection surface in the sub-scanning direction, however, has a radius of curvature set independently from the cross-sectional shape in the main scanning direction. Furthermore, in an embodiment, one surface of the anamorphic lens 17 is made of a barrel shaped or deformed barrel shaped toroidal surface.

Figure 37:
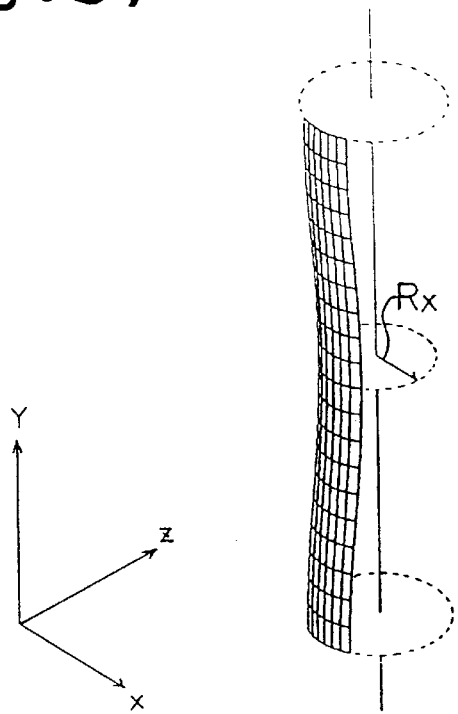
FIG. 37 is a diagram of a barrel-shaped toroidal surface.

FIG. 37 shows the barrel-shaped toroidal surface which is defined as follows. Assuming that the optical axis is identical to the Z-axis, the main scanning direction is identical to the Y-axis, and the sub-scanning direction is identical to the X-axis, respectively, the barrel-shaped toroidal surface is obtained by rotating a curve defined by:

$$Z = C_y y^2/(1+(1-(1+k)C_y^2 y^2)^{1/2}) + A2y^2 + A4y^4 + A6y^6 + \ldots$$

wherein CY represents the paraxial curvature (=1/RY) in the main scanning direction and k represents the conic constant, respectively, about an axis parallel with and spaced from the Y-axis in the optical axis direction by RX (radius of curvature in the sub-scanning direction). The line which defines the center of curvature in the sub-scanning direction is a straight line parallel to the rotational axis.

Figure 38:
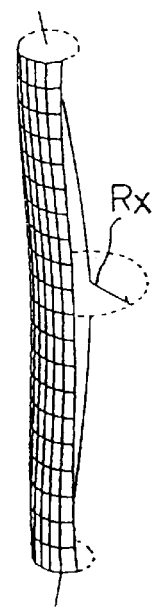
FIG. 38 is a diagram of a Deformed Barrel-shaped toroidal surface.

FIG. 38 shows the deformed barrel shaped toroidal surface which is defined as follows.

Assuming that the optical axis of the surface is identical to the Z-axis, the main scanning direction is identical to the Y-axis, and the sub-scanning direction is identical to the X-axis, respectively, the Y-Z section is represented by:

$$Z = C_y y^2/(1+(1-(1+k)C_y^2 y^2)^{1/2}) + A2y^2 + A4y^4 + A6y^6 + \ldots$$

wherein $C_Y$ represents the paraxial curvature (=1/$R_Y$) in the main scanning direction and k represents the conic constant, and the curvature $C_x(y)$ in the sub-scanning direction is represented by:

$$C_x(y) = C_x(0) + AS_1 y + AS_2 y^2 + \ldots$$

wherein $C_x(0)$ represents the paraxial curvature (=1/$R_x$) in the sub-scanning direction. The center of curvature in the sub-scanning direction varies according to the image height in the main scanning direction. In other words, the line which defines the center of curvature in the sub-scanning direction is a curve or the centers of curvature in the sub-scanning direction follow a curved locus.

Now the first aspect of the present invention will be explained via the use of numerical examples of the first to fifth embodiments. The radius of curvature is defined as 'positive' when the center of curvature is behind the surface with respect to the incident light rays. In tables 1 through 5 below, K represents the scanning constant. In an ideal fθ optical system, assuming that the image height at a certain field angle θ (rad.) is Y (mm), we have K=|Y/θ|.

Figure 39:
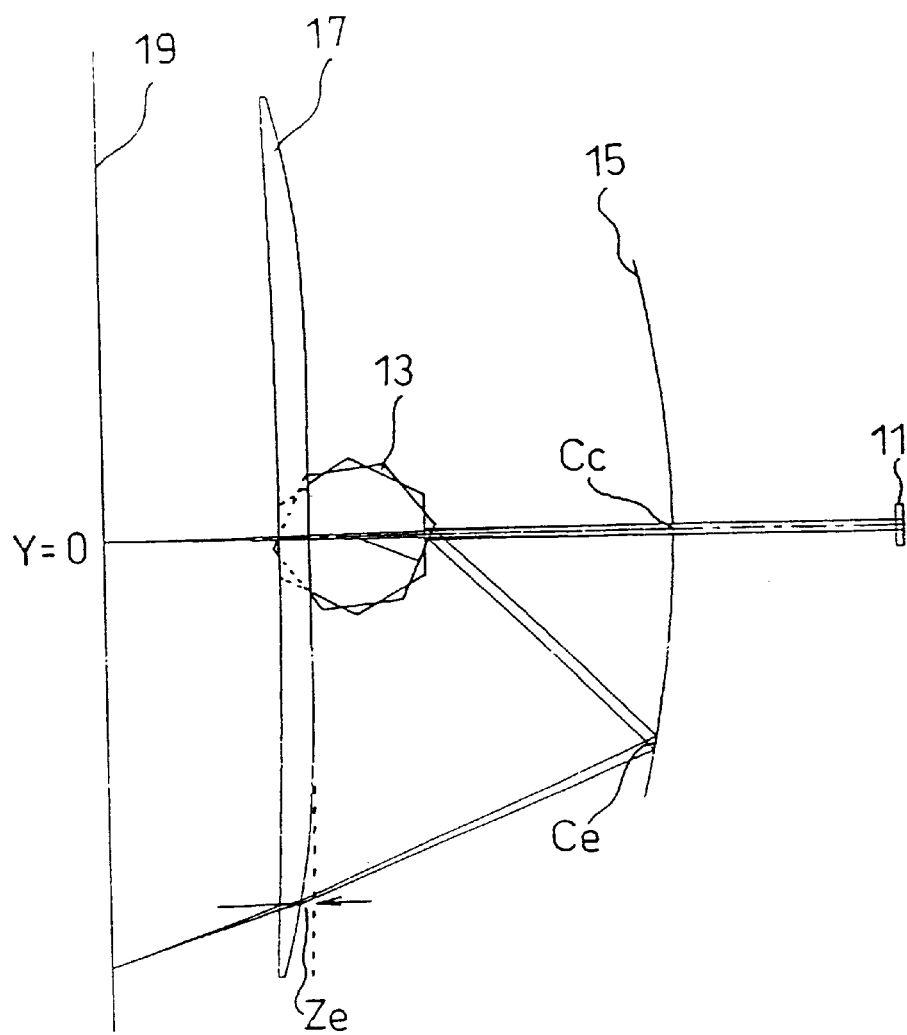
FIG. 39 is a diagram showing the curvature in the main scanning direction upon the light rays being made incident on the curved reflection mirror.

Note, as shown in FIG. 39, that Cc and Ce (mm$^{-1}$) represent the curvatures, in the sub-scanning direction, of the curved reflection mirror 15 at a position where the light rays travelling toward the center of the object surface 19 and the ends of the object surface 19 are incident thereupon, respectively. Ze (mm) represents the amount of sag, in the main scanning plane, of the toroidal surface at a position at which the light travelling toward the object surface 19 to be scanned is made incident upon the toroidal surface of the anamorphic lens 17.

Embodiment 1

Figure 3B:
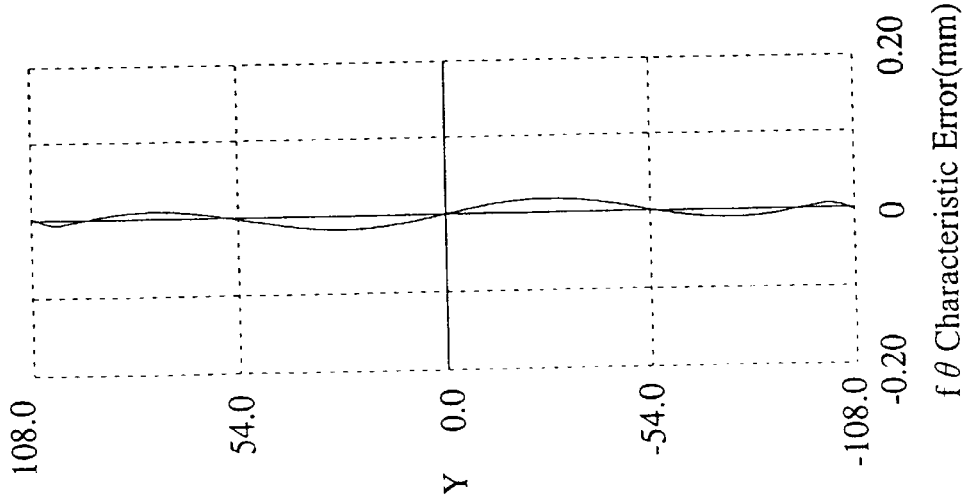

FIGS. 3A and 3B are graphs showing an fθ characteristic error of the scanning line and the field curvature in the meridional direction (main scanning direction) M and sagittal direction (sub-scanning direction) S, in a reflection type optical scanning system whose numerical data is shown in Table 1 below, as shown in FIGS. 1 and 2, respectively.

Figure 4A:
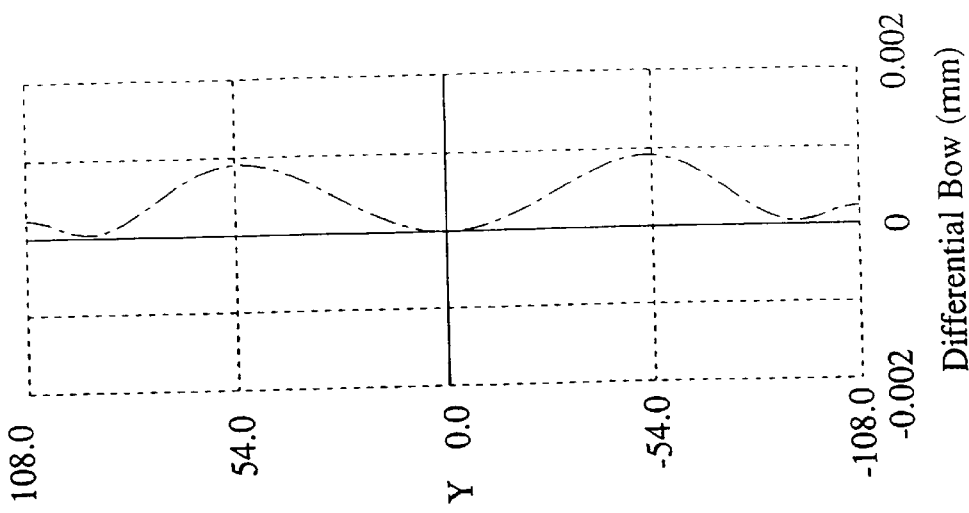
FIGS. 4A and 4B are graphs showing the variation of the f-number and a differential bow, in the first embodiment, respectively.
Figure 4B:
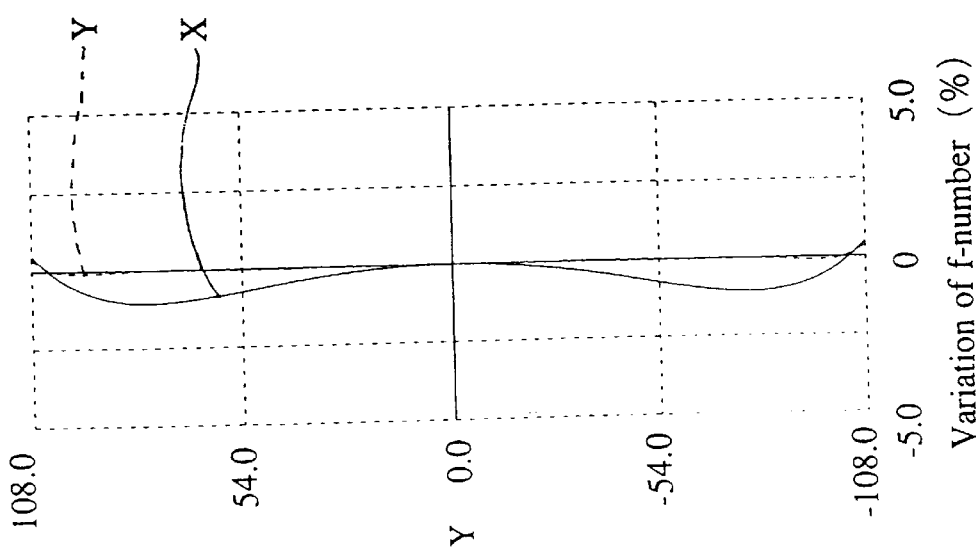

In FIGS. 3A and 3B, the ordinate represents the image height (mm) and abscissa represents the deviation (mm) from the ideal image height in FIG. 3A and deviation (mm) from the object surface in FIG. 3B. In FIGS. 4A and 4B, the ordinate represents the image height (mm) and abscissa represents the variation (%) of the f-number in the main scanning direction Y and the sub-scanning direction X with reference to a value at Y=0 in FIG. 4A and the differential bow (mm) in FIG. 4B, respectively. In the tables below, Ry (mm) designates the radius of curvature in the Y-axis direction (the main scanning direction), Rx (mm) the radius of curvature in the X-axis direction (the sub-scanning direction), D (mm) the lens thickness or distance between the lens surfaces, and n the refractive index of the used wavelength (=780 nm), respectively.

In the reflective surface 4 of the curved reflection mirror 15 of the first embodiment, the curvature in the sub-scanning direction varies positively as the image height in the main scanning direction increases. The shape of the reflective surface 4 in the main scanning plane is a arc. The anamorphic lens 17 has a barrel-shaped toroidal surface 5 on the polygon mirror (deflector) 13 side, and the shape of the main scanning cross-section is a concave arc with respect to the curved reflective surface.

TABLE 1

| K = 135. | W = 45.67° | Used Wavelength 780 nm | | |
|---|---|---|---|---|
| No. | RY | RX | D | n(780 nm) |
| 1 | ∞ | 55.42 | 2.00 | 1.48617 |
| 2 | ∞ | — | 113.00 | |
| 3 | ∞ | — | 57.20 | (Polygon Mirror 13) |

TABLE 1-continued

| | K = 135. | W = 45.67° | Used Wavelength 780 nm | |
|---|---|---|---|---|
| No. | RY | RX | D | n(780 nm) |
| 4 | −263.50 | ∞ | 102.50 | (Curved Mirror 15) |
| 5 | −1700.00 | 12.30 | 7.00 | 1.48617 |
| 6 | 560.60 | — | | |

No.4: Deformed Barrel-Shaped Toroidal Surface
k=−9.00
$A2=-8.30 \times 10^{-6}$ $A4=-1.80 \times 10-8$ $A6=2.5 \times 10^{-13}$
$AS2=1.65 \times 10^{-7}$ $AS4=5.60 \times 10^{-11}$
No.5: Barrel-Shaped Toroidal Surface
k=16.20
$A4=-4.00 \times 10^{-9}$ $A6=-4.60 \times 10^{-13}$
No.6: Rotationally symmetrical aspheric surface
k=18.70
$A4=-1.40 \times 10^{-7}$ $A6=-9.70 \times 10^{-13}$
Incident angle on polygon mirror α=5.00°
Incident angle on curved mirror β=6.00°
Anamorphic lens deviation DX=−1.600 mm
(Ce−Cc)/W=0.000019
$2Ze/h_y^2 = -0.00069 < -0.4$ (Ce−Cc)=−0.00034

Embodiment 2

Figure 5:
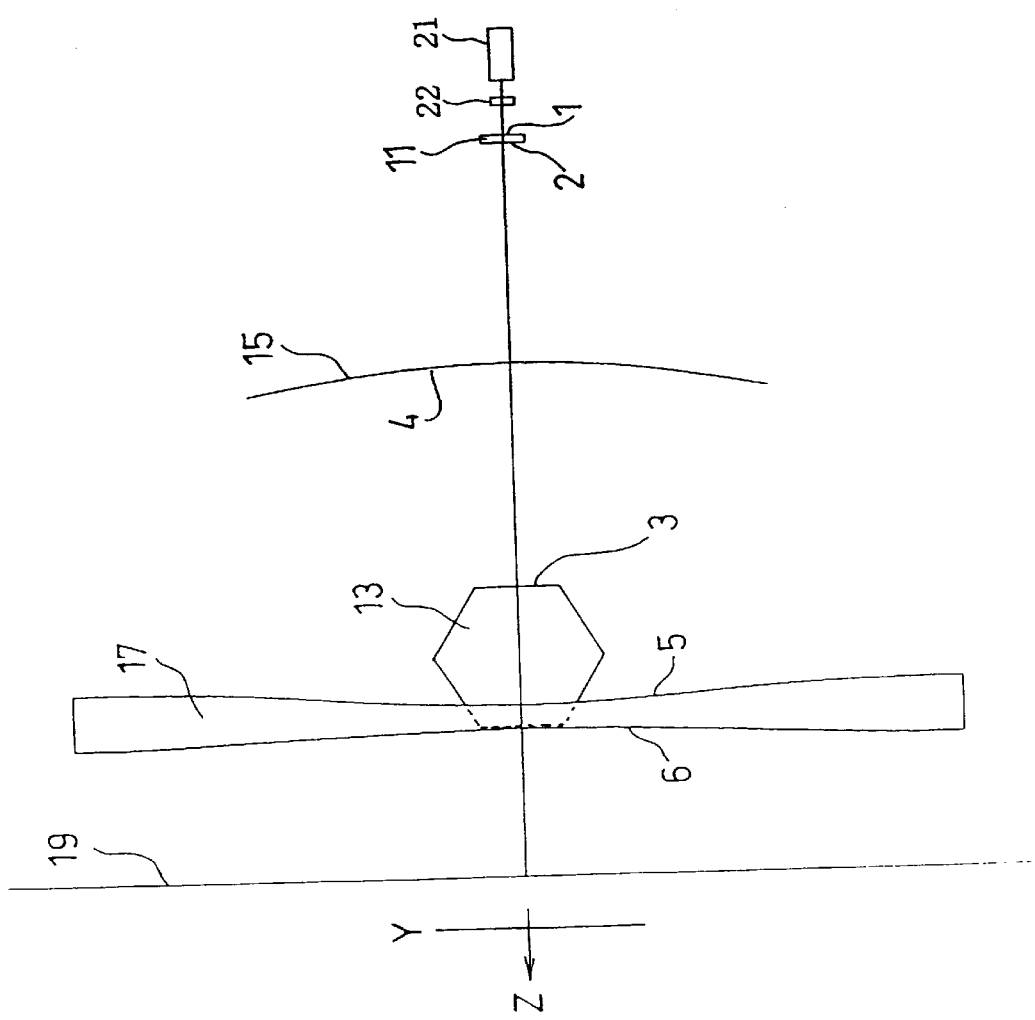
FIG. 5 is a diagram showing a reflection type optical scanning system of the second embodiment in the main scanning plane, according to the first aspect of the present invention.
Figure 6:
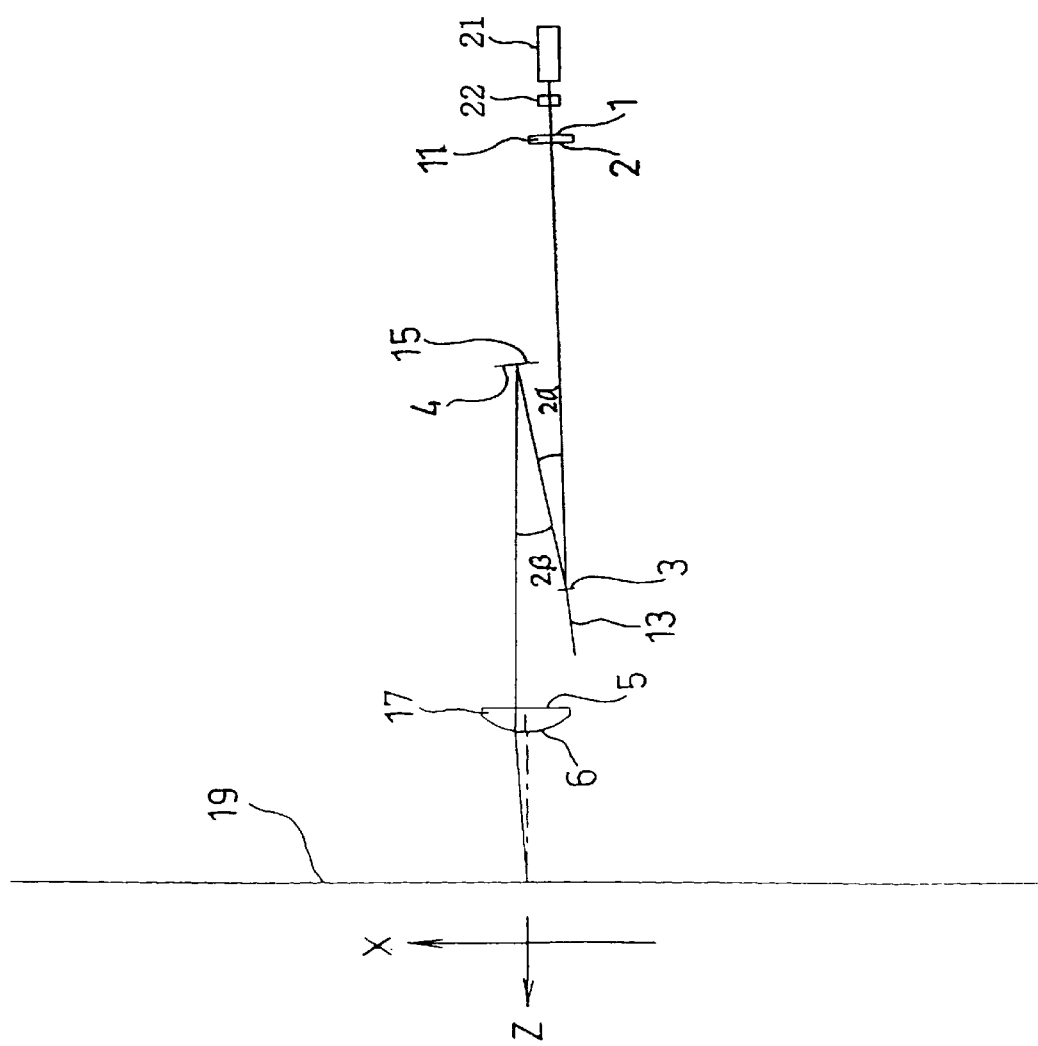
FIG. 6 is a diagram showing a reflection type optical scanning system of the second embodiment in the sub-scanning plane.
Figure 7A:
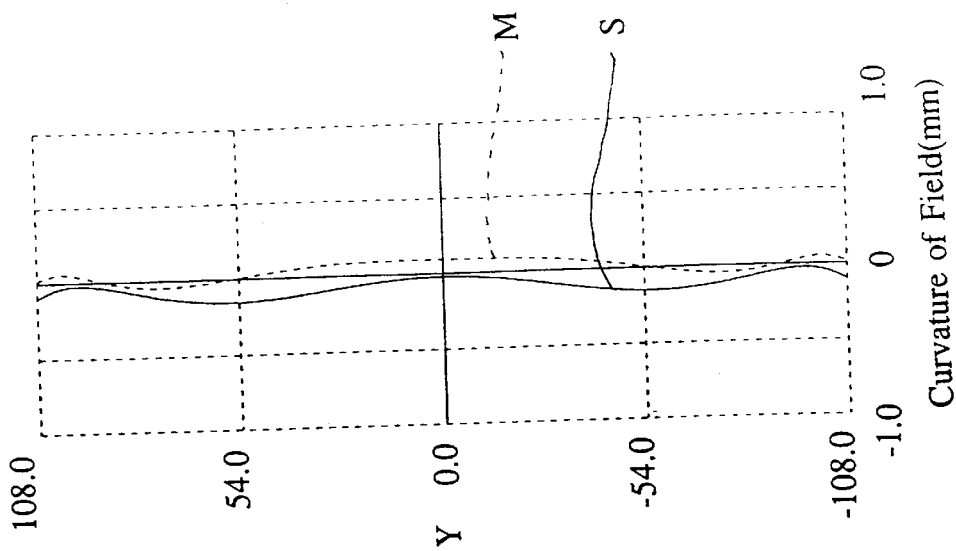
FIGS. 7A and 7B are graphs showing an fθ characteristic error of a scanning line and a curvature of the field, in the second embodiment, respectively.
Figure 7B:
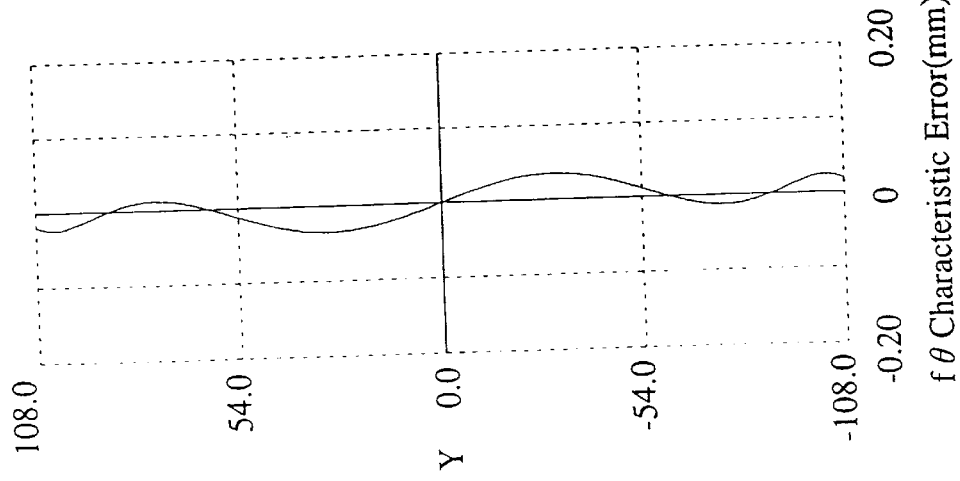
Figure 8A:
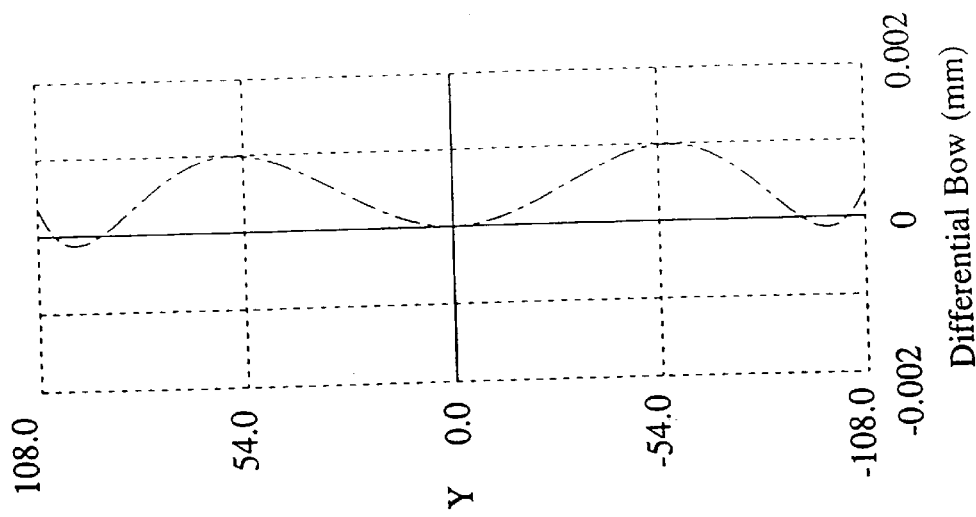
FIGS. 8A and 8B are graphs showing the variation of the f-number and a differential bow, in the second embodiment, respectively.
Figure 8B:
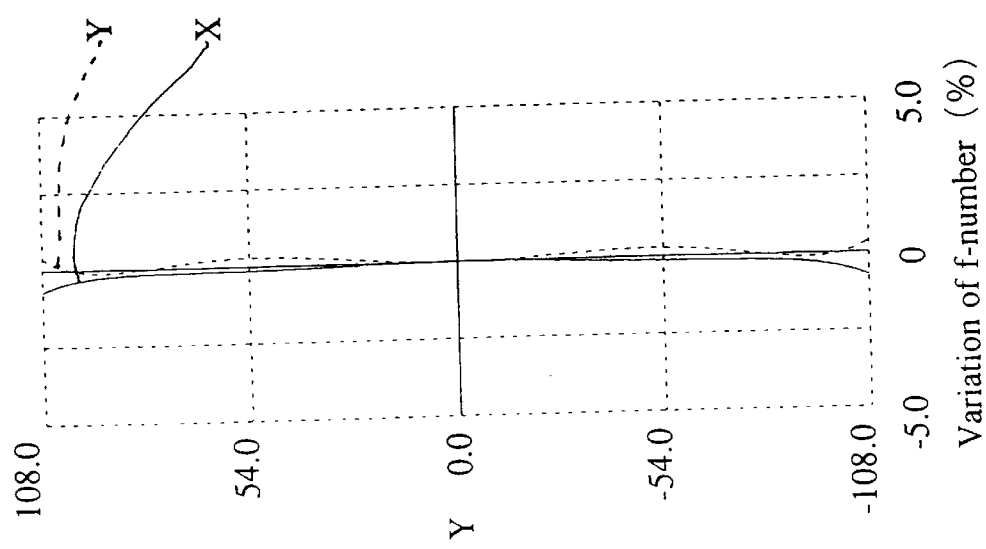

FIGS. 7A and 7B (which are comparable to FIGS. 3A and 3B) are graphs showing an fθ characteristic error of the scanning line and the field curvature in a reflection type optical scanning system as shown in FIGS. 5 and 6, the numerical data of which is shown in Table 2 below. FIGS. 8A and 8B (which are comparable to FIGS. 4A and 4B) show the variation of the f-number and the differential bow, respectively.

In the reflective surface 4 of the curved reflection mirror 15 of the second embodiment, the curvature in the sub-scanning direction varies negatively as the image height in the main scanning direction increases. The shape of the reflective surface 4 in the main scanning plane is a arc. The anamorphic lens 17 has a barrel-shaped toroidal surface 6 on the object surface 19 side; the shape of the main scanning cross-section is a concave arc with respect to the object surface 19.

TABLE 2

| | K = 135.5 | W = 45.67° | Used Wavelength 780 nm | |
|---|---|---|---|---|
| No. | RY | RX | D | n(780 nm) |
| 1 | ∞ | 55.42 | 2.00 | 1.48617 |
| 2 | ∞ | — | 113.00 | |
| 3 | ∞ | — | 58.00 | (Polygon Mirror 13) |
| 4 | −252.00 | −540.00 | 87.00 | (Curved Mirror 15) |
| 5 | −372.70 | — | 6.00 | 1.48617 |
| 6 | 861.00 | −15.50 | | |

No.4: Deformed Barrel-Shaped Toroidal Surface
k=−8.00
$A2=-8.70 \times 10^{-6}$ $A4=-6.00 \times 10^{-9}$ $A6=-1.0 \times 10^{-12}$
$AS2=-3.60 \times 10^{-7}$
No.5: Rotationally symmetrical aspheric surface
k=0.00
$A4=1.26 \times 10^{-7}$ $A6=-3.80 \times 10^{-12}$
No.6: Barrel-Shaped Toroidal Surface
k=0.00
$A4=-2.66 \times 10-8$
Incident angle on polygon mirror α=5.00°
Incident angle on curved mirror β=6.00°
Anamorphic lens deviation DX=−2.450 mm
(Ce−Cc)/W=−0.000022
$2Ze/h_y^2 = 0.00067 > -0.4$ (Ce−Cc)=0.00039

Embodiment 3

Figure 9:
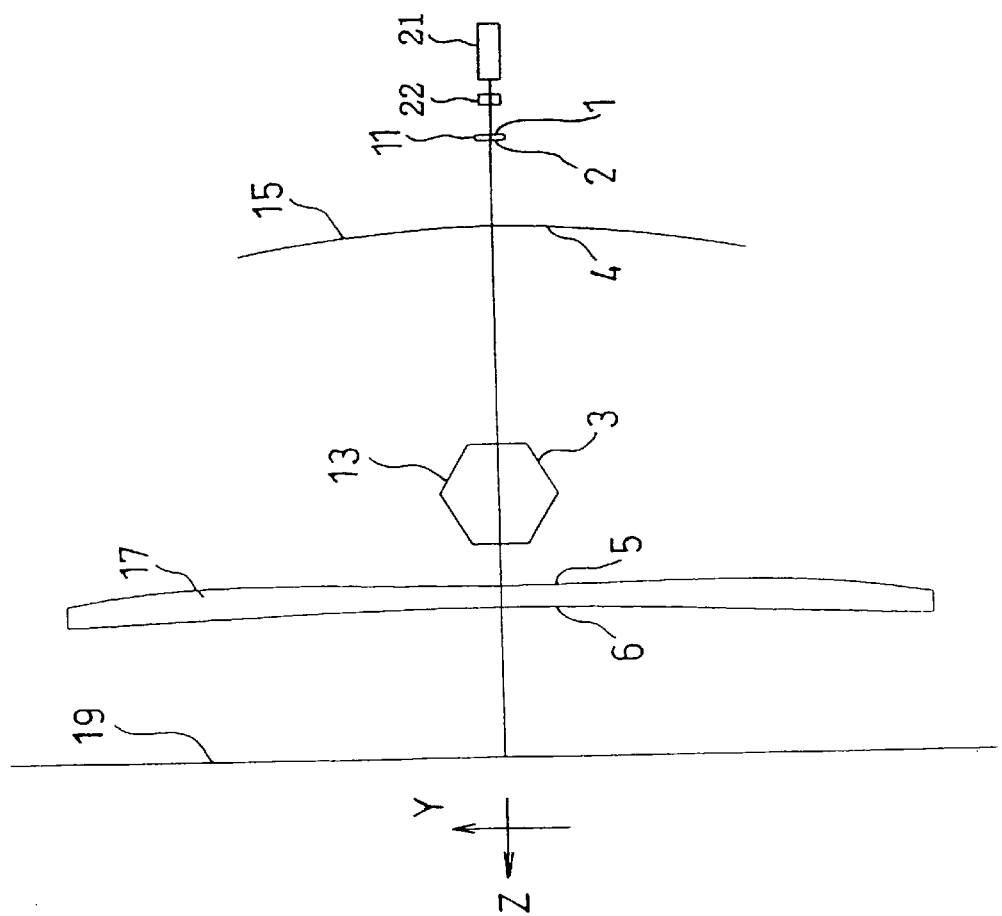
FIG. 9 is a diagram showing a reflection type optical scanning system of the third embodiment in the main scanning plane, according to the first aspect of the present invention.
Figure 10:
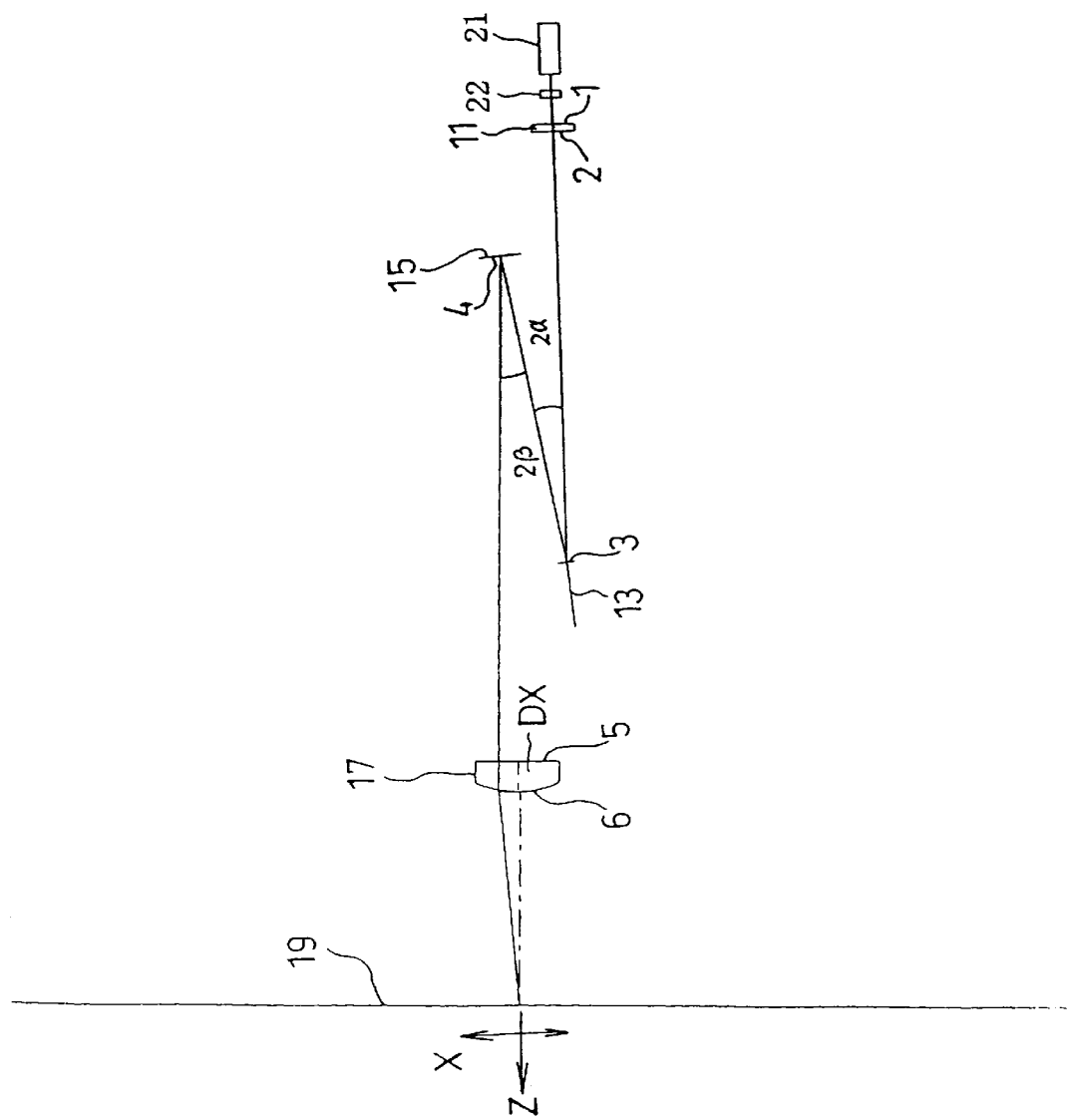
FIG. 10 is a diagram showing a reflection type optical scanning system of the third embodiment in the sub-scanning plane.
Figure 11A:
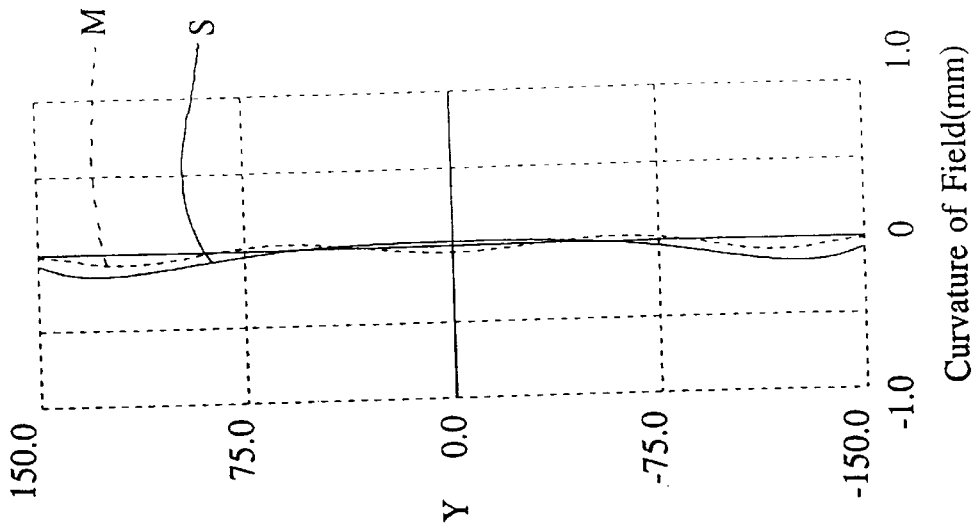
FIGS. 11A and 11B are graphs showing an fθ characteristic error of a scanning line and a curvature of the field, in the third embodiment, respectively.
Figure 11B:
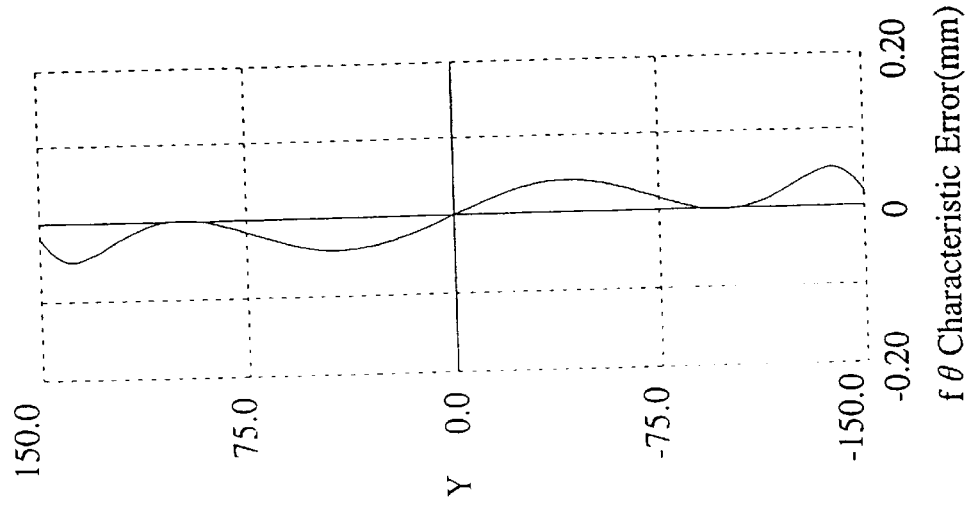
Figure 12A:
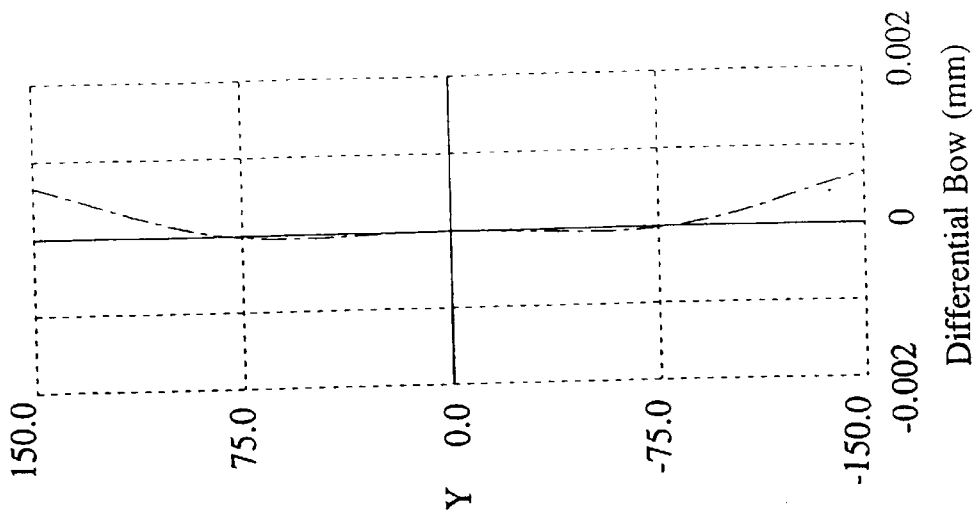
FIGS. 12A and 12B are graphs showing the variation of the f-number and a differential bow, in the third embodiment, respectively.
Figure 12B:
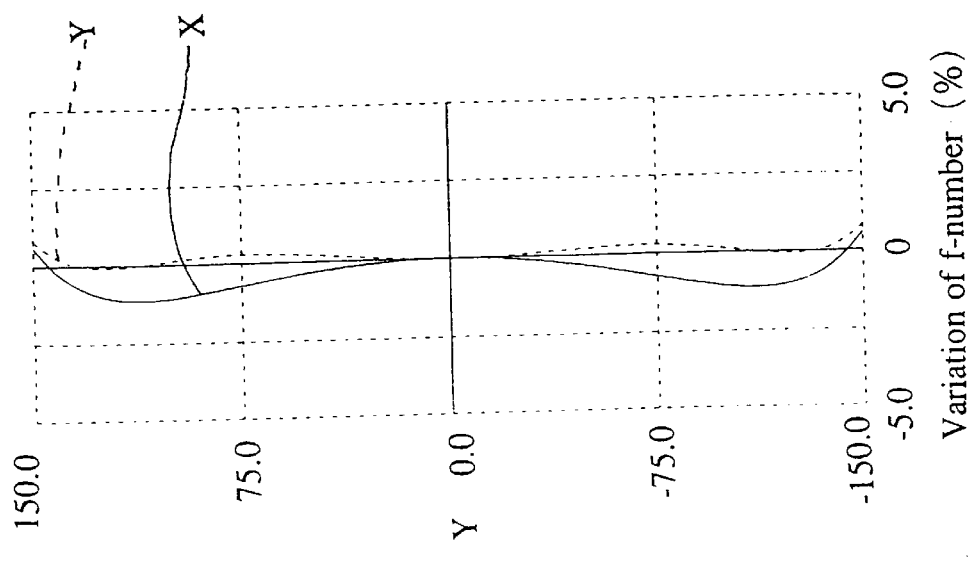

FIGS. 11A and 11B (which are comparable to FIGS. 3A and 3B) are graphs showing an fθ characteristic error of the scanning line and the field curvature in a reflection type optical scanning system as shown in FIGS. 9 and 10, the numerical data of which is shown in Table 3 below. FIGS. 12A and 12B (which are comparable to FIGS. 4A and 4B) show the variation of the f-number and the differential bow, respectively.

In the reflective surface 4 of the curved reflection mirror 15 of the third embodiment, the curvature in the sub-scanning direction varies negatively as the image height in the main scanning direction increases. The shape of the reflective surface 4 in the main scanning plane is a arc. The anamorphic lens 17 has a barrel-shaped toroidal surface 6 on the object surface 19 side; the shape of the main scanning cross-section is a concave arc with respect to the object surface 19.

TABLE 3

| | K = 200.0 | W = 42.97° | Used Wavelength 780 nm | |
|---|---|---|---|---|
| No. | RY | RX | D | n(780 nm) |
| 1 | ∞ | 55.42 | 2.00 | 1.48617 |
| 2 | ∞ | — | 113.00 | |
| 3 | ∞ | — | 82.00 | (Polygon Mirror 13) |
| 4 | 383.00 | −432.00 | 132.40 | (Curved Mirror 15) |
| 5 | −1320.00 | — | 8.00 | 1.48617 |
| 6 | 1290.00 | −25.00 | | |

No.4: Deformed Barrel-Shaped Toroidal Surface
k=−12.50
$A2=-5.00 \times 10^{-6}$ $A4=-7.90 \times 10^{-9}$
$AS2=-1.00 \times 10^{-7}$ $AS4=-2.00 \times 10^{-11}$
No.5: Rotationally symmetrical aspheric surface
k=0.00
$A4=3.32 \times 10^{-8}$ $A6=-3.16 \times 10^{-13}$
No.6: Barrel-Shaped Toroidal Surface
k=0.00
$A4=-1.28 \times 10^{-8}$ $A6=2.30 \times 10^{-13}$
Incident angle on polygon mirror α=5.00°
Incident angle on curved mirror β=−6.00°
Anamorphic lens deviation DX=−4.830 mm
(Ce−Cc)/W=−0.000022
$2Ze/hy2 = 0.00042 > -0.4$ (Ce−Cc)=0.00038

Embodiment 4

Figure 13:
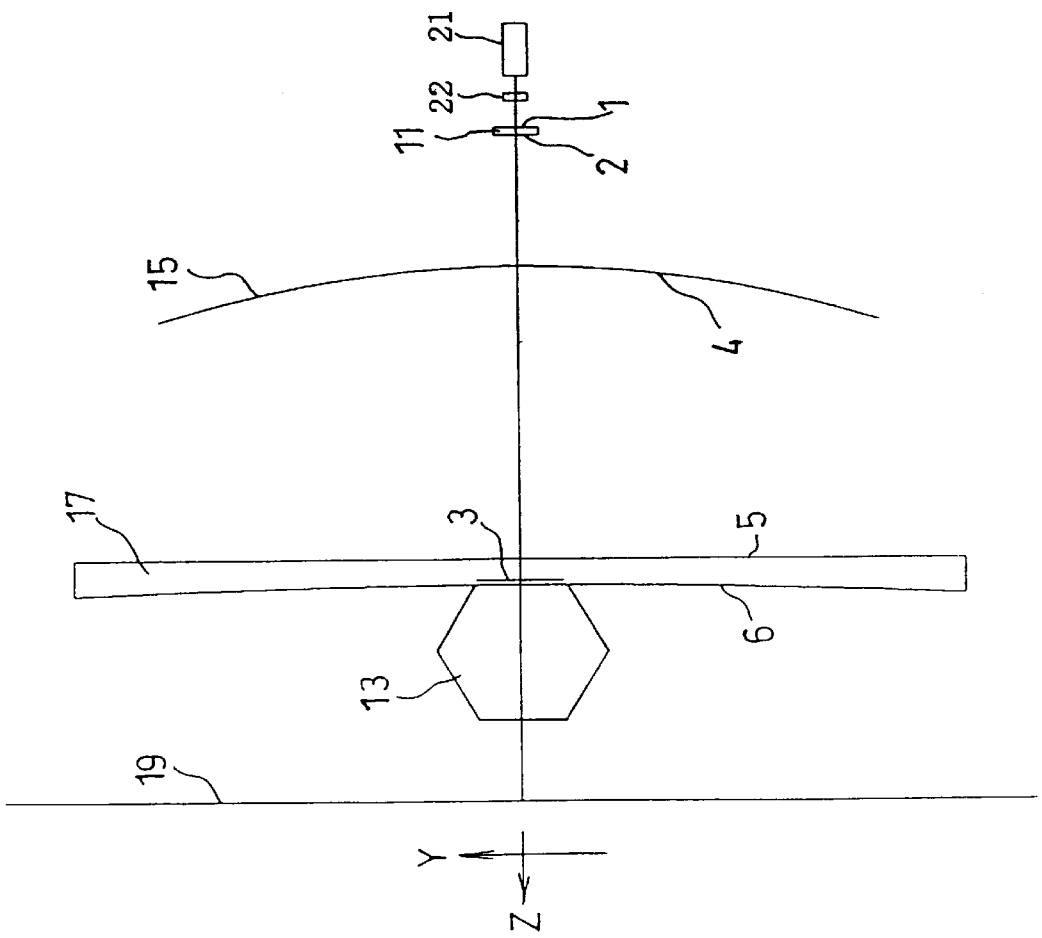
FIG. 13 is a diagram showing a reflection type optical scanning system of the fourth embodiment in the main scanning plane, according to the first aspect of the present invention.
Figure 14:
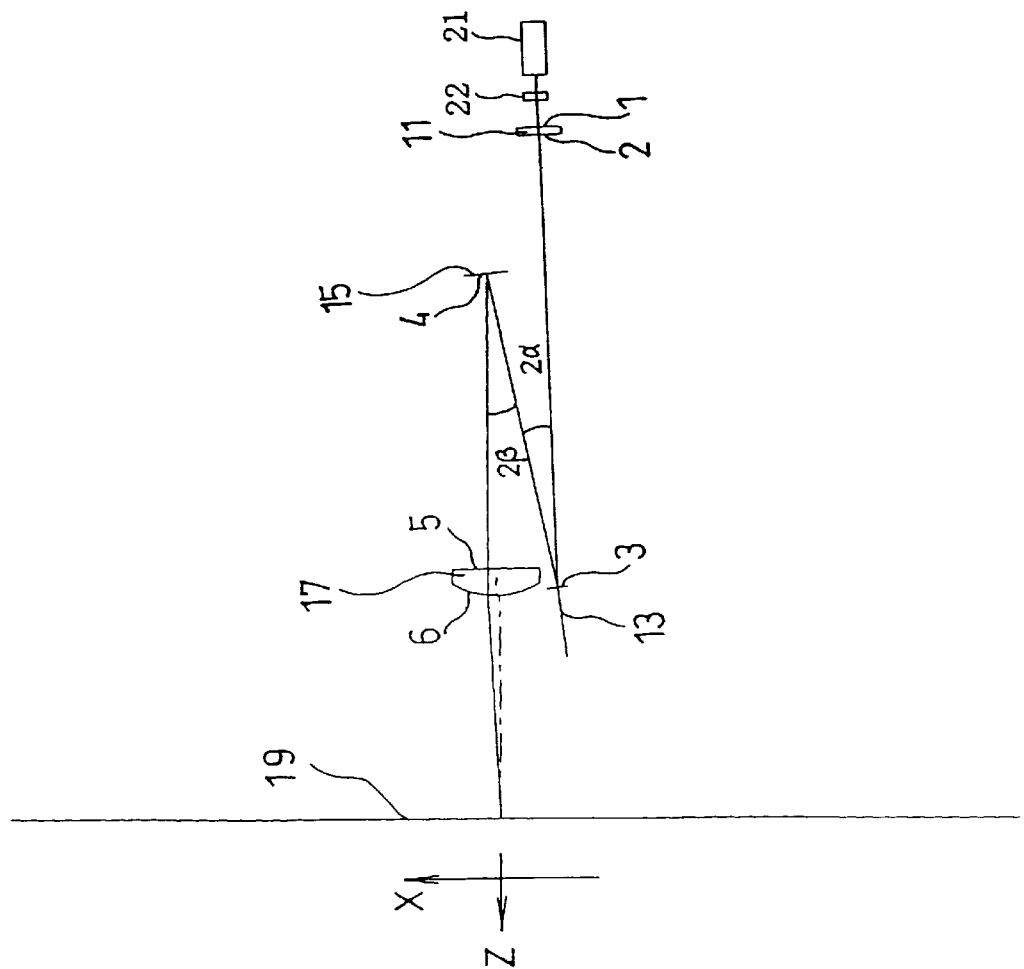
FIG. 14 is a diagram showing a reflection type optical scanning system of the fourth embodiment in the sub-scanning plane.
Figure 15A:
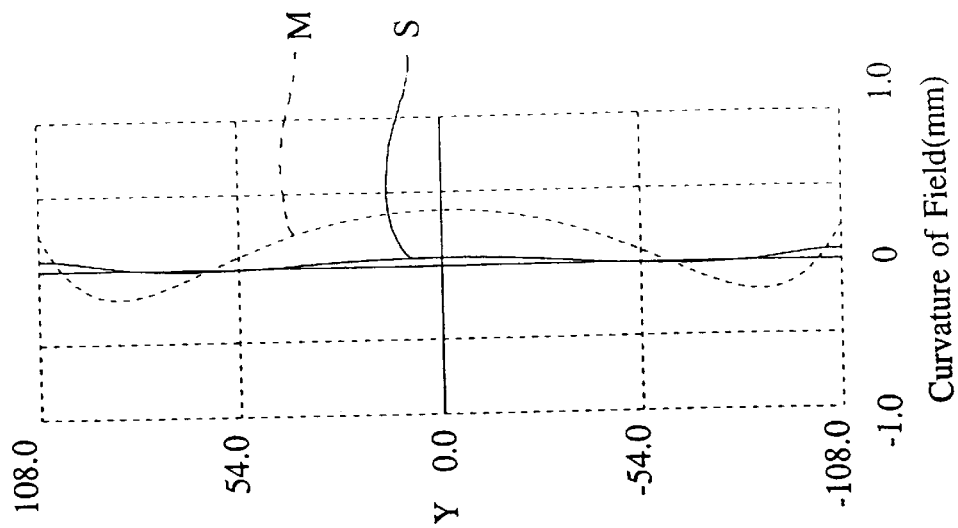
FIGS. 15A and 15B are graphs showing an fθ characteristic error of a scanning line and a curvature of the field, in the fourth embodiment, respectively.
Figure 15B:
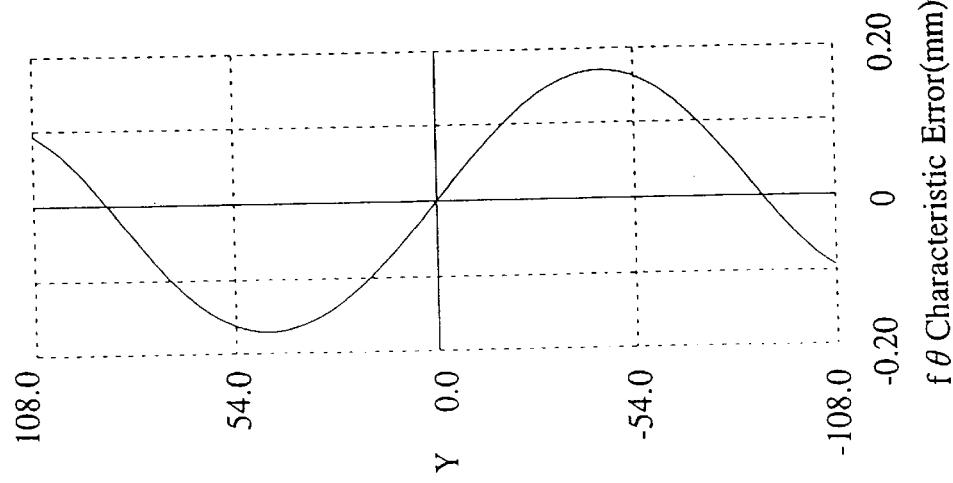
Figure 16A:
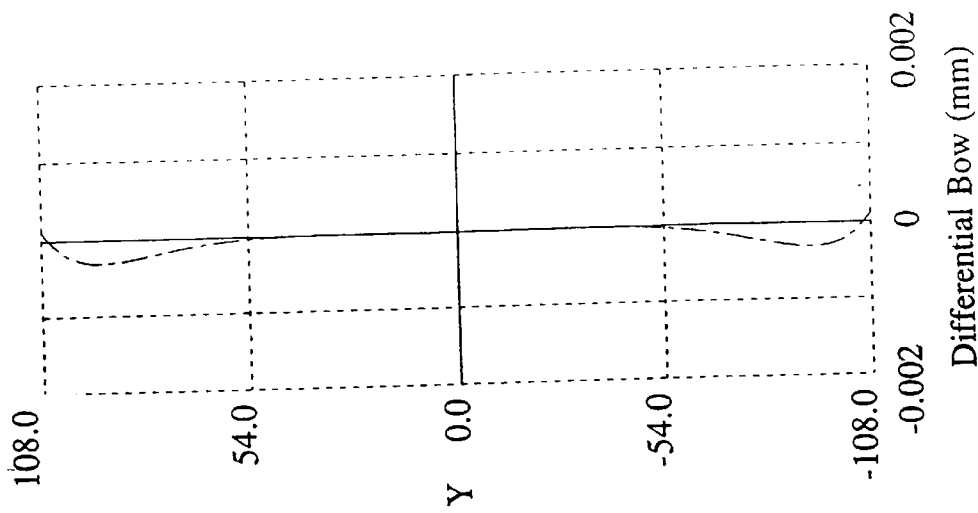
FIGS. 16A and 16B are graphs showing the variation of the f-number and a differential bow, in the fourth embodiment, respectively.
Figure 16B:
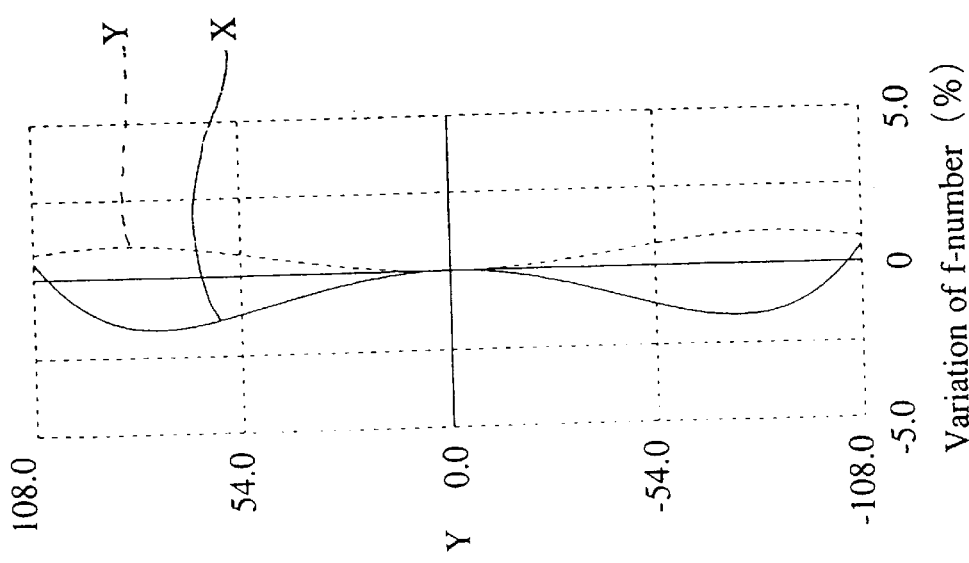

FIGS. 15A and 15B (which are comparable to FIGS. 3A and 3B) are graphs showing an fθ characteristic error of the scanning line and the field curvature, in a reflection type optical scanning system as shown in FIGS. 13 and 14, the numerical data of which is shown in Table 4 below. FIGS. 16A and 16B (which are comparable to FIGS. 4A and 4B) show the variation of the f-number and the differential bow, respectively.

In the reflective surface 4 of the curved reflection mirror 15 of the fourth embodiment, the curvature in the sub-scanning direction varies negatively as the image height in the main scanning direction increases. The shape of the reflective surface 4 in the main scanning plane is a arc. The anamorphic lens 17 has a barrel-shaped toroidal surface 6 on the object surface 19 side; the shape of the main scanning cross-section is a concave arc with respect to the object surface 19.

TABLE 4

| K = 135.5 | W = 45.67° | Used Wavelength 780 nm | | |
|---|---|---|---|---|
| No. | RY | RX | D | n(780 nm) |
| 1 | ∞ | 55.42 | 2.00 | 1.48617 |
| 2 | ∞ | — | 113.00 | |
| 3 | ∞ | — | 80.50 | (Polygon Mirror 13) |
| 4 | −266.20 | 609.00 | 74.00 | (Curved Mirror 15) |
| 5 | ∞ | — | 6.50 | 1.48617 |
| 6 | 2264.00 | −20.00 | | |

No.4: Deformed Barrel-Shaped Toroidal Surface
k=−4.70
$A2=-1.10\times10^{-6}$ $A4=-2.02\times10^{-8}$ $A6=2.70\times10^{-13}$
$AS2=8.00\times10^{-8}$ $AS4=-4.40\times10^{-11}$
No.6: Barrel-Shaped Toroidal Surface
k=0.00
Incident angle on polygon mirror α=5.00°
Incident angle on curved mirror β=−6.00°
Anamorphic lens deviation DX=−2.000 mm
(Ce−Cc)/W=−0.000016
2Ze/hy2=0.00041>−0.4 (Ce−Cc)=0.00029

Embodiment 5

Figure 17:
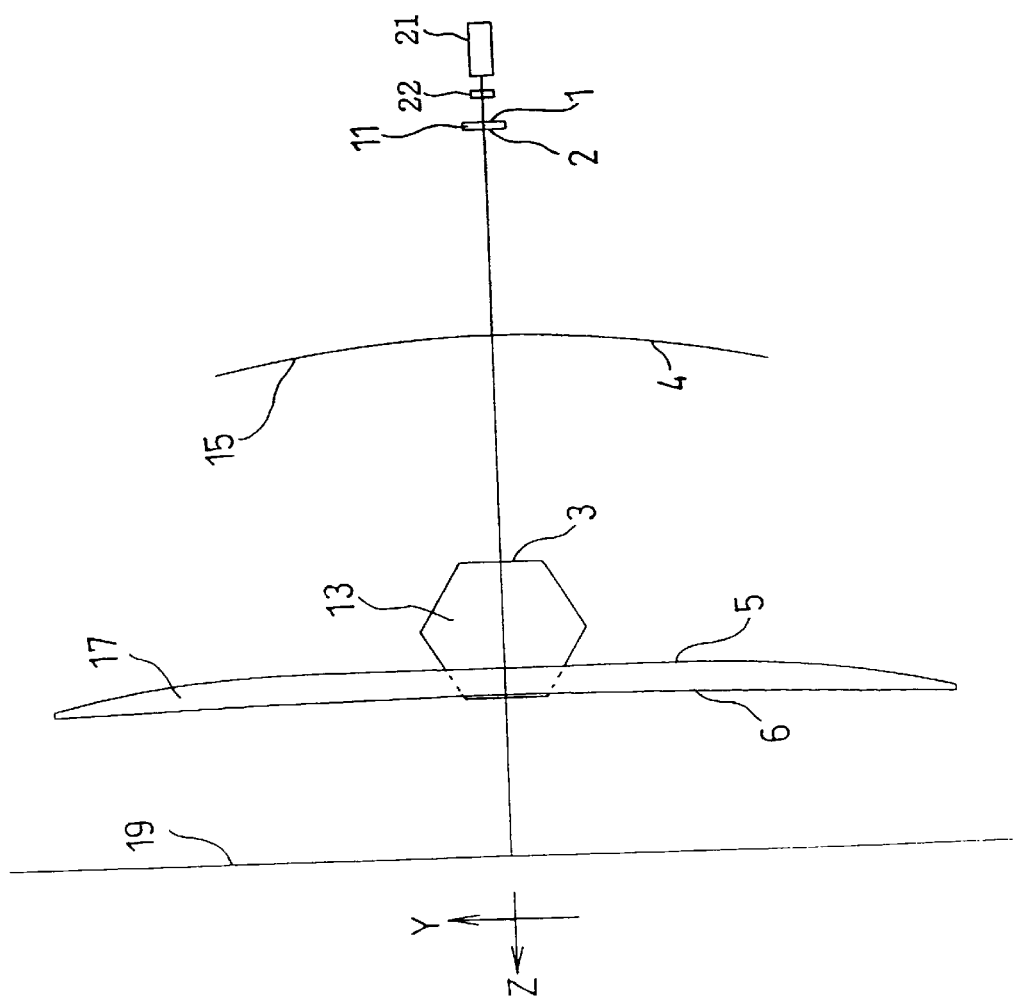
FIG. 17 is a diagram showing a reflection type optical scanning system of the fifth embodiment in the main scanning plane, according to the first aspect of the present invention.
Figure 18:
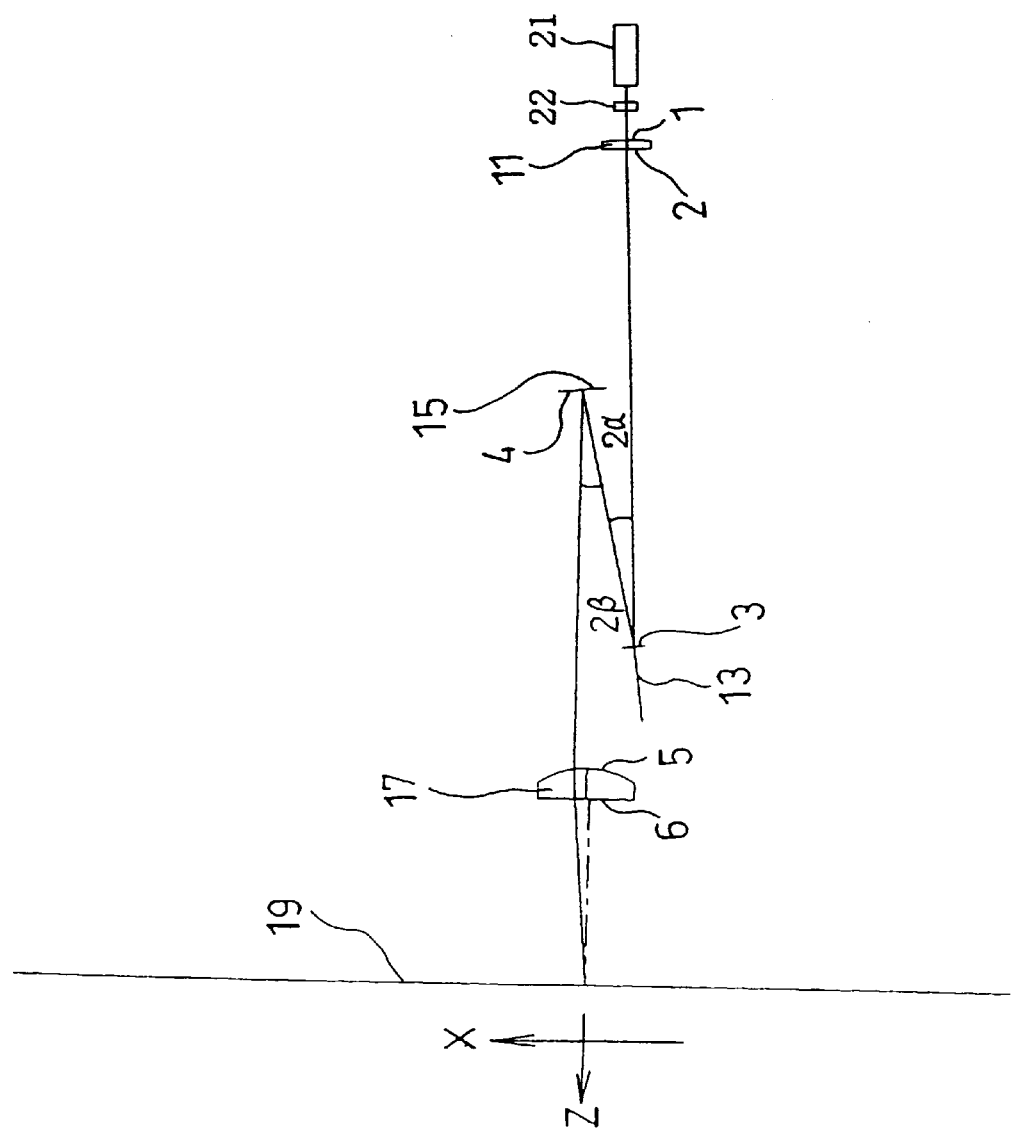
FIG. 18 is a diagram showing a reflection type optical scanning system of the fifth embodiment in the sub-scanning plane.
Figure 19A:
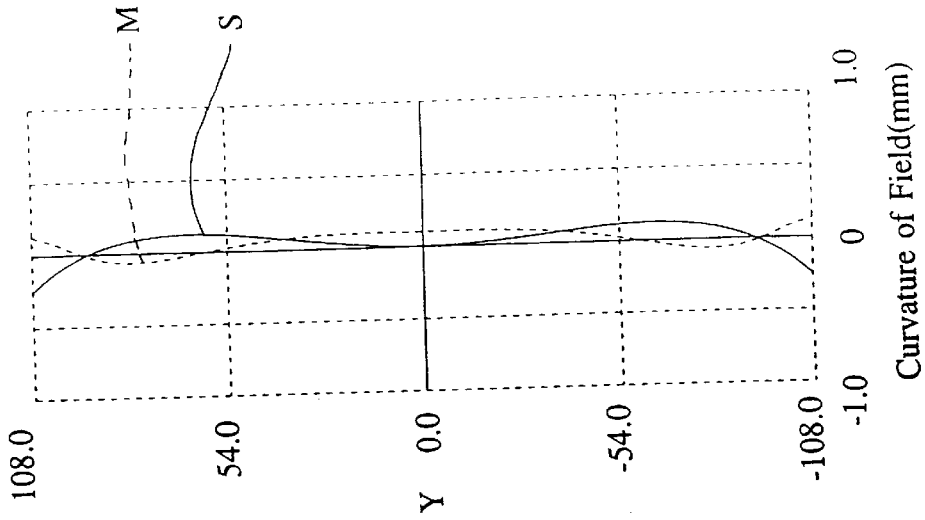
FIGS. 19A and 19B are graphs showing an fθ characteristic error of a scanning line and a curvature of the field, in the fifth embodiment, respectively.
Figure 19B:
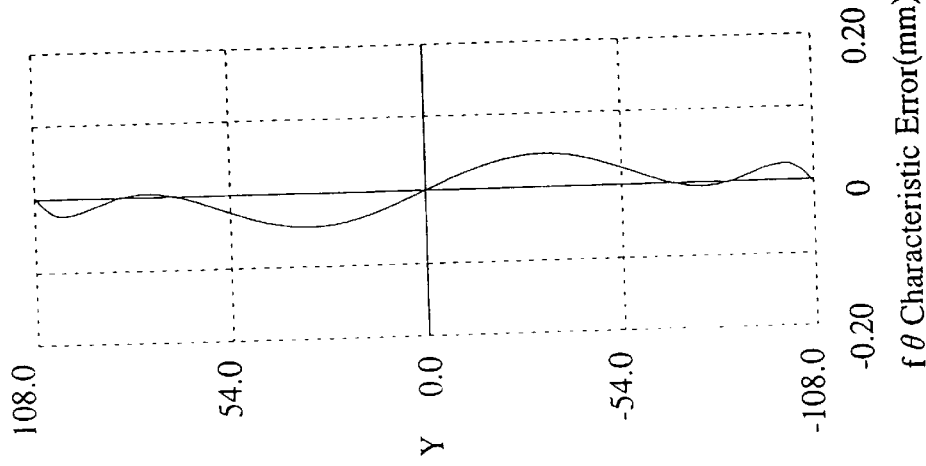
Figure 20B:
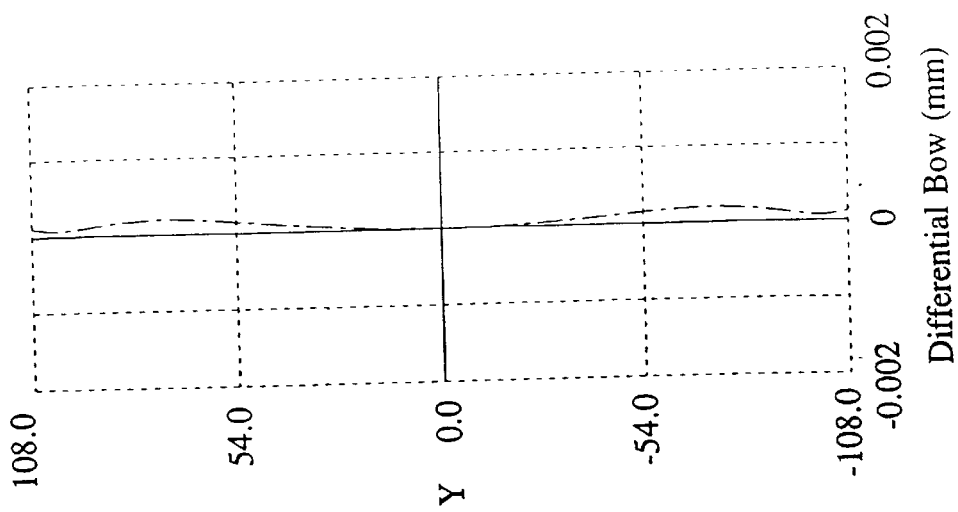
FIGS. 20A and 20B are graphs showing the variation of the f-number and a differential bow, in the fifth embodiment, respectively.
Figure 20A:
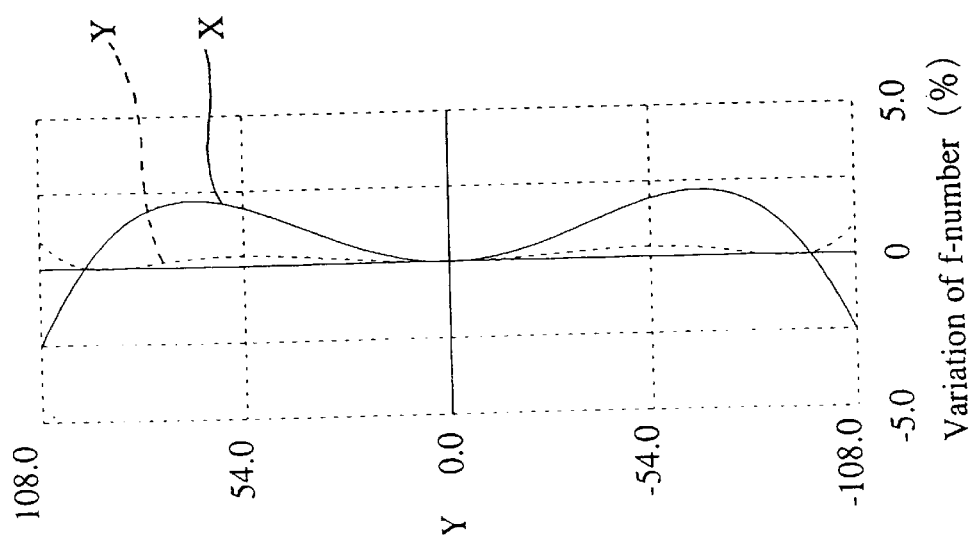

FIGS. 19A and 19B (which are comparable to FIGS. 3A and 3B) are graphs showing an fθ characteristic error of the scanning line and the field curvature in a reflection type optical scanning system as shown in FIGS. 17 and 18, the numerical data of which is shown in Table 5 below. FIGS. 20A and 20B which correspond to FIGS. 4A and 4B show the variation of the f-number and the differential bow, respectively.

In the reflective surface 4 of the curved reflection mirror 15 of the fifth embodiment, the curvature in the sub-scanning direction varies negatively as the image height in the main scanning direction increases. The shape of the reflective surface 4 in the main scanning plane is a arc. The anamorphic lens 17 has a deformed barrel-shaped toroidal surface 6 on the curved mirror 15 side; the shape of the sub-scanning plane being a convex surface; the power of which decreases as the image height in the main scanning direction increases.

TABLE 5

| K = 135.5 | W = 45.67° | Used Wavelength 780 nm | | |
|---|---|---|---|---|
| No. | RY | RX | D | n(780 nm) |
| 1 | ∞ | 55.42 | 2.00 | 1.48617 |
| 2 | ∞ | — | 113.00 | |
| 3 | ∞ | — | 59.90 | (Polygon Mirror 13) |
| 4 | −267.00 | −650.00 | 86.50 | (Curved Mirror 15) |
| 5 | 3420.00 | 18.00 | 7.00 | 1.48617 |
| 6 | 2520.00 | — | | |

No.4: Deformed Barrel-Shaped Toroidal Surface
k=−9.70
$A2=-2.00\times10^{-5}$ $A4=-1.70\times10^{-8}$ $A6=-2.70\times10^{-13}$
$AS2=-4.00\times10^{-7}$ $AS4=-5.20\times10^{-11}$
No.5: Deformed Barrel-Shaped Toroidal Surface
k=−3.00
$A2=-4.50\times10^{-4}$ $A4=1.06\times10^{-7}$ $A6=-2.40\times10^{-12}$
$AS2=-1.50\times10^{-6}$ $AS4=7.00\times10^{-11}$
Incident angle on polygon mirror α=5.00°
Incident angle on curved mirror β=−6.00°
Anamorphic lens deviation DX=−2.760 mm
(Ce−Cc)/W=−0.000036

As can be seen from the above discussion, in a reflection type optical scanning system according to the first aspect of the present invention, the variation of the f-number in the sub-scanning direction and the occurrence of the differential bow can be restricted in a well-balanced fashion.

According to the first aspect of the present invention, in a reflection type optical scanning system having a curved reflection mirror, the curved mirror or the anamorphic lens is provided with a surface whose shape is such that the radius of curvature in the sub-scanning direction can be determined independently of the radius of curvature in the main scanning direction, so that the magnification in the sub-scanning direction, determined by the portion of the scanning system located behind the deflector, can be kept substantially constant. Consequently, not only can the variation of the f-number in the sub-scanning direction be corrected, little or no differential bow occurs.

The second aspect of the invention will be discussed below with reference to FIGS. 21 through 36.

The second aspect of the invention reduces skew distortion in the wave surface without having to off-set the anamorphic lens (whereas the first aspect reduces the differential bow). The curved mirror which is inclined with respect to the optical axis is made of a barrel-shaped toroidal surface, shape in section thereof in the main scanning direction being a concave arc having a single center of curvature or an arc (i.e., not having a single point as a center of curvature) with respect to the incident light and the shape in section thereof in the sub-scanning direction being a convex arc having a single center of curvature with respect to the incident light, so that the light from the deflector is reflected at a predetermined angle in the sub-scanning direction toward the object surface to be scanned and that the anamorphic lens is not deviated from the optical axis in the sub-scanning direction.

FIGS. 21, 25, 29 and 33 show four embodiments in the main scanning plane of a reflection type optical scanning system according to a second aspect of the present invention. FIGS. 22, 26, 30 and 34 are sectional views of the four embodiments in the sub-scanning plane.

In the sixth through ninth embodiments (i.e., first through fourth embodiments of the second aspect of the invention), the laser beam emitted from a laser source 21 is collimated via collimator 22; is transmitted through a cylindrical lens 11; is made incident upon a polygonal mirror (deflector) 13 at a predetermined incident angle; is reflected by the polygonal mirror 13 at a predetermined reflection angle toward a curved mirror 15; is reflected by the curved mirror 15 toward an object surface (photosensitive body) 19 to be scanned, at a predetermined reflection angle; is transmitted through an anamorphic lens 17; and is made incident upon the object surface 19 to form a beam spot thereon. The laser beam is deflected along the object surface 19 in the direction Y (main scanning direction) in FIG. 21. The optical axis Z of the scanning system is defined by the light path of the principal ray when the deflection angle produced by the polygonal mirror 13 in the main scanning direction is zero. Also, when the deflection angle is zero, the image height Y is zero (Y=0).

The polygonal mirror 13 is rotated about a rotation axis and is provided on the peripheral surface thereof with a plurality of reflection surfaces. The rotation axis of the polygonal mirror 13 is inclined at a predetermined angle in the sub-scanning plane with respect to the incident light. The basic arrangement of the optical elements mentioned above is identical in the following four embodiments of the second aspect of the invention.

In the second aspect of the invention, the reflection surface of the curved mirror 15 is an anamorphic surface which is a concave in the main scanning plane and convex in the sub-scanning plane. In the four embodiments according to the second aspect of the invention, the anamorphic surface is a barrel-shaped or deformed barrel-shaped toroidal surface.

The barrel-shaped toroidal surface of FIG. 37 is defined as follows:

Assuming that the optical axis is identical to the Z-axis, the main scanning direction is identical to the Y-axis, and the sub-scanning direction is identical to the X-axis, the barrel-shaped toroidal surface is obtained by revolving a curve defined by:

$$Z = C_y y^2 / (1 + (1-(1+k) C_y^2 y^2)^{1/2}) + A2 y^2 + A4 y^4 + A6 y^6 + \ldots$$

wherein $C_y$ represents the paraxial curvature (=1/RY) in the main scanning direction and k represents the conic constant about an axis parallel with and spaced from the Y-axis in the optical axis direction by RX (radius of curvature). The line which defines the center of curvature in the sub-scanning direction is the rotational axis and a straight line parallel thereto.

The deformed barrel shaped toroidal surface shown in FIG. 38 is defined as follows:

Assuming that the optical axis of the surface is identical to the Z-axis, the main scanning direction is identical to the Y-axis, and the sub-scanning direction is identical to the X-axis, the Y-Z section is represented by:

$$Z = C_y y^2 / (1 + (1-(1+k) C_y^2 y^2)^{1/2}) + A2 y^2 + A4 y^4 + A6 y^6 + \ldots$$

wherein $C_y$ represents the paraxial curvature (=1/RY) in the main scanning direction and k represents the conic constant, and the curvature Cx(y) in the sub-scanning direction is represented by:

$$Cx(y) = Cx(0) + AS_1 y + AS_2 y^2 + \ldots$$

wherein Cx(0) represents the axial curvature (=1/RX) in the sub-scanning direction. The center of curvature in the sub-scanning direction varies according to the height in the main scanning direction. In other words, the line which defines the center of curvature in the sub-scanning direction is a curve.

Now the second aspect of the present invention will be explained via the use of numerical examples of the sixth through ninth embodiments. The radius of curvature is defined as 'positive' when the center of curvature is behind the surface with respect to the incident light rays. In tables 6 through 9 below, K represents the scanning constant. In an ideal fθ optical system, assuming that the image height at a certain field angle θ(rad.) is Y(mm), we have K=|Y/θ|.

Note that Cc and Ce (mm$^{-1}$) represent the curvature of the curved mirror 15 in the sub-scanning direction with respect to the light travelling toward the center of the object surface 19 and the ends of the object surface 19, respectively. Ze (mm) represents the amount of sag of the toroidal surface at a position at which the light travelling toward the object surface 19 to be scanned is made incident upon the toroidal surface of the anamorphic lens 17.

Embodiment 6

Figure 22:
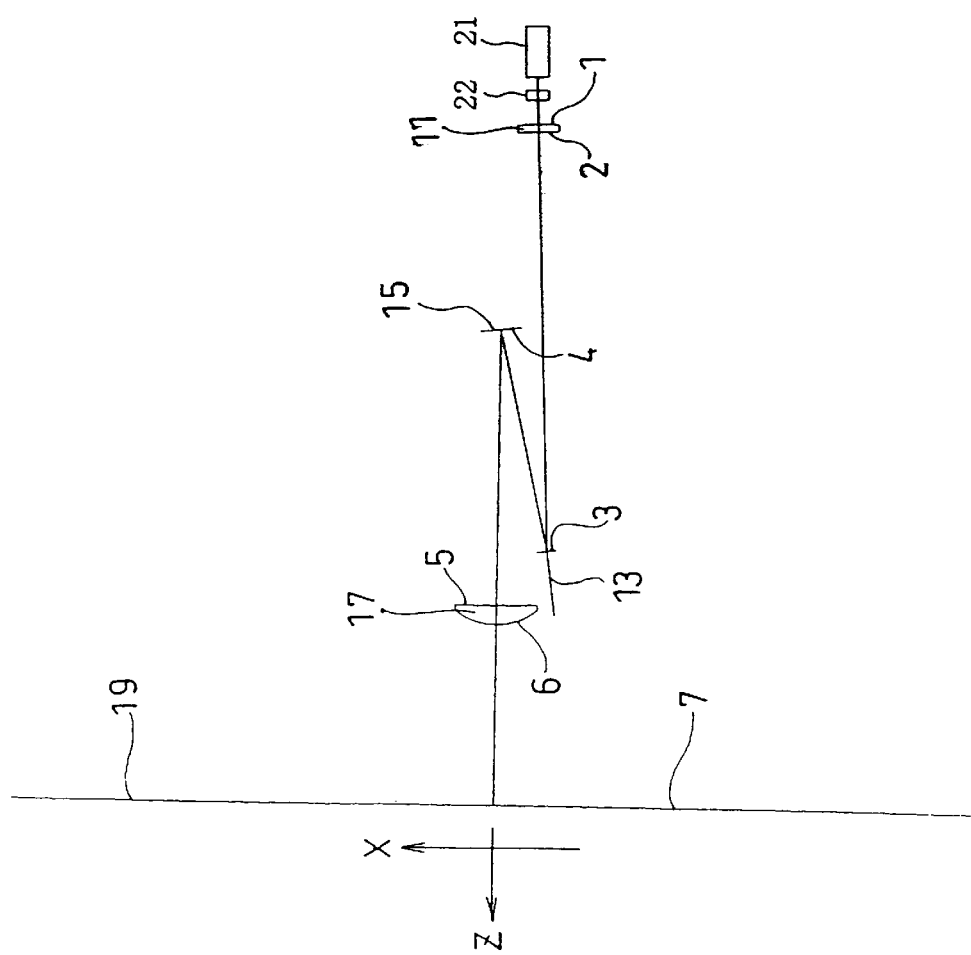
FIG. 22 is a diagram showing a reflection type optical scanning system of the sixth embodiment in the sub-scanning plane.
Figure 23A:
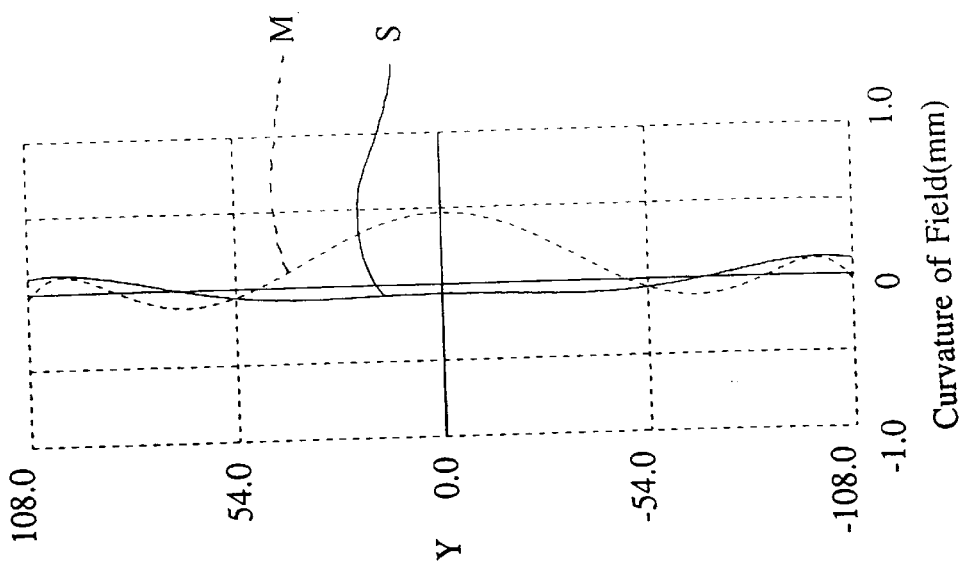
FIGS. 23A and 23B are graphs showing an fθ characteristic error of a scanning line and a curvature of the field, in the sixth embodiment, respectively.
Figure 23B:
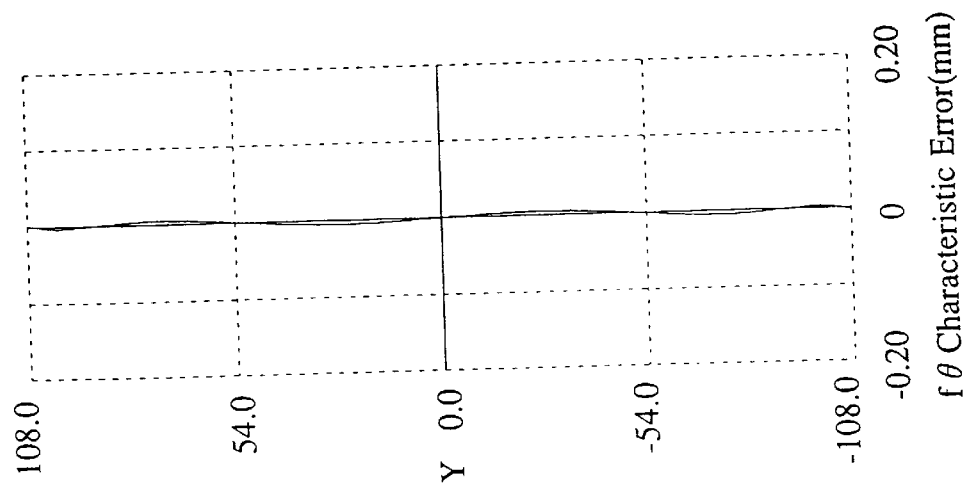

FIGS. 23A and 23B are graphs showing an fθ characteristic error of the scanning line and the field curvature in the meridional direction (main scanning direction) M and sagittal direction (sub-scanning direction) S in a reflection type optical scanning system, as shown in FIGS. 21 and 22, whose numerical data is shown in Table 6 below.

Figure 24A:
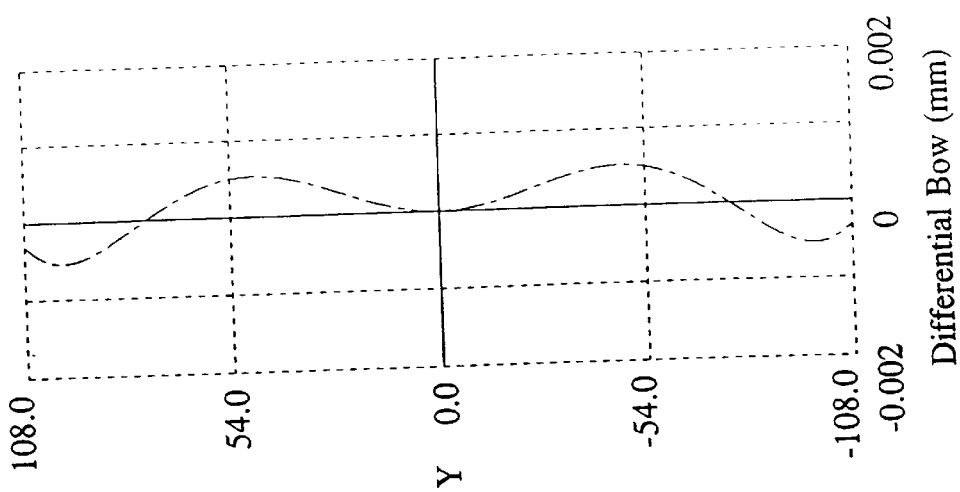
FIGS. 24A and 24B are graphs showing the variation of the f-number and a differential bow, in the sixth embodiment, respectively.
Figure 24B:
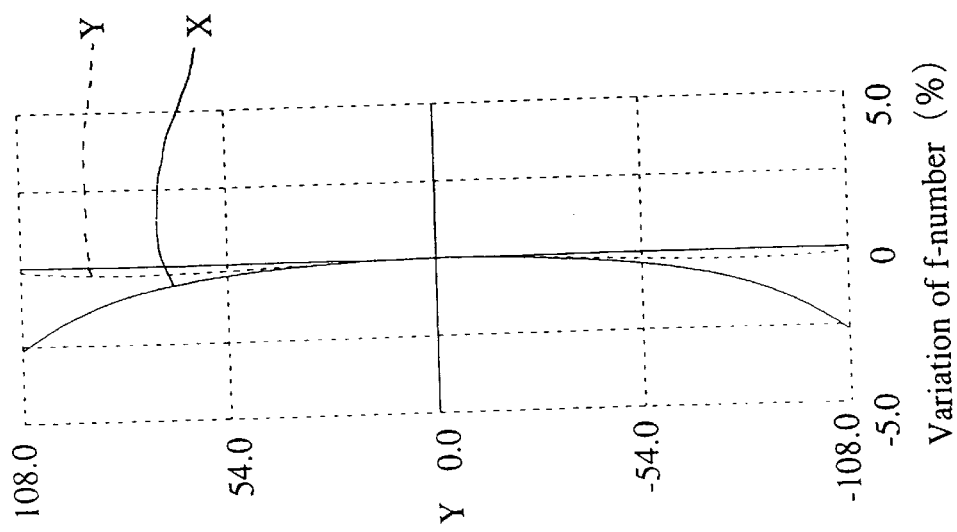

In FIGS. 23A and 23B, the ordinate represents the image height (mm) and abscissa represents the deviation (mm) from the ideal image height in FIG. 23A and deviation (mm) from the paraxial image surface in FIG. 23B. In FIGS. 24A and 24B, the ordinate represents the image height (mm) and abscissa represents the variation (%) of the f-number in the main scanning direction Y and the sub-scanning direction X with reference to a value at Y=0 in FIG. 24A and the differential bow (mm) in FIG. 24B. In tables below, RY (mm) designates the radius of curvature in the Y-axis direction (main scanning direction), RX (mm) the radius of curvature in the X-axis direction (sub-scanning direction), D (mm) the lens thickness or distance between the lens surfaces, and n the refractive index of the used wavelength (=780 nm), respectively.

TABLE 6

K = 135.5   W = 45.67°   Used Wavelength 780 nm

| No. | RY | RX | D | n(780 nm) |
|---|---|---|---|---|
| 1 | ∞ | 55.42 | 2.00 | 1.48617 |
| 2 | ∞ | — | 113.00 | |
| 3 | ∞ | — | 61.00 | (Polygon Mirror 13) |
| 4 | −243.20 | 280.00 | 74.30 | (Curved Mirror 15) |
| 5 | −321.000 | — | 5.00 | 1.48617 |
| 6 | 717.60 | −16.23 | | |

No.4: Barrel-Shaped Toroidal Surface
k=−3.60
A4=2.20×10$^{-8}$  A6=−2.00×10$^{-12}$ No.5: Rotationally symmetrical aspheric surface
k=−14.90
A4=7.70×10$^{-8}$  A6=−2.10×10$^{-12}$  A8=−1.40×10$^{-17}$ No.6: Barrel-Shaped Toroidal Surface
k=0.00
A4=−4.00×10$^{-8}$  A6=1.05×10$^{-12}$ Incident angle on polygon mirror α=5.00°
Incident angle on curved mirror β=−6.00°
(Ce−Cc)/W=−0.000002
2Ze/$h_y^2$=0.00092>−0.4 (Ce−Cc)=0.00003

Embodiment 7

Figure 25:
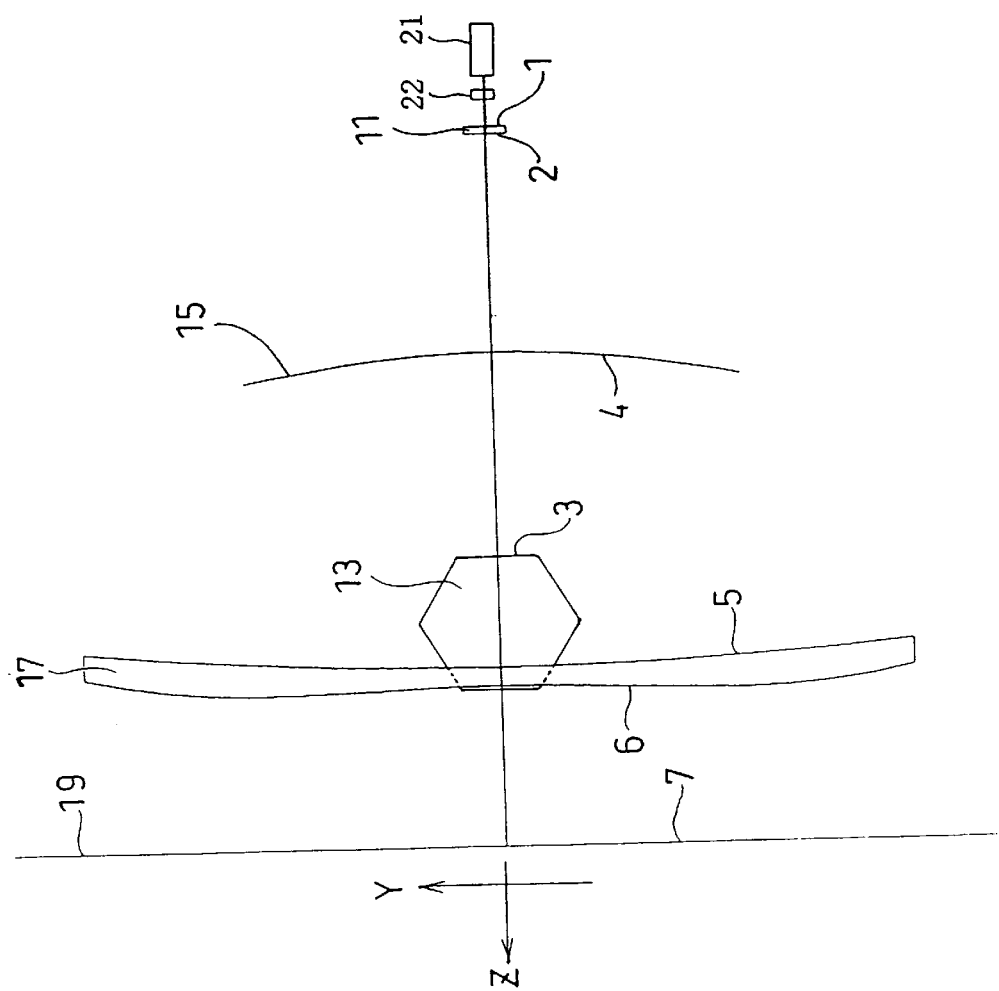
FIG. 25 is a diagram showing a reflection type optical scanning system of the seventh embodiment in the main scanning plane, according to the second aspect of the present invention.
Figure 26:
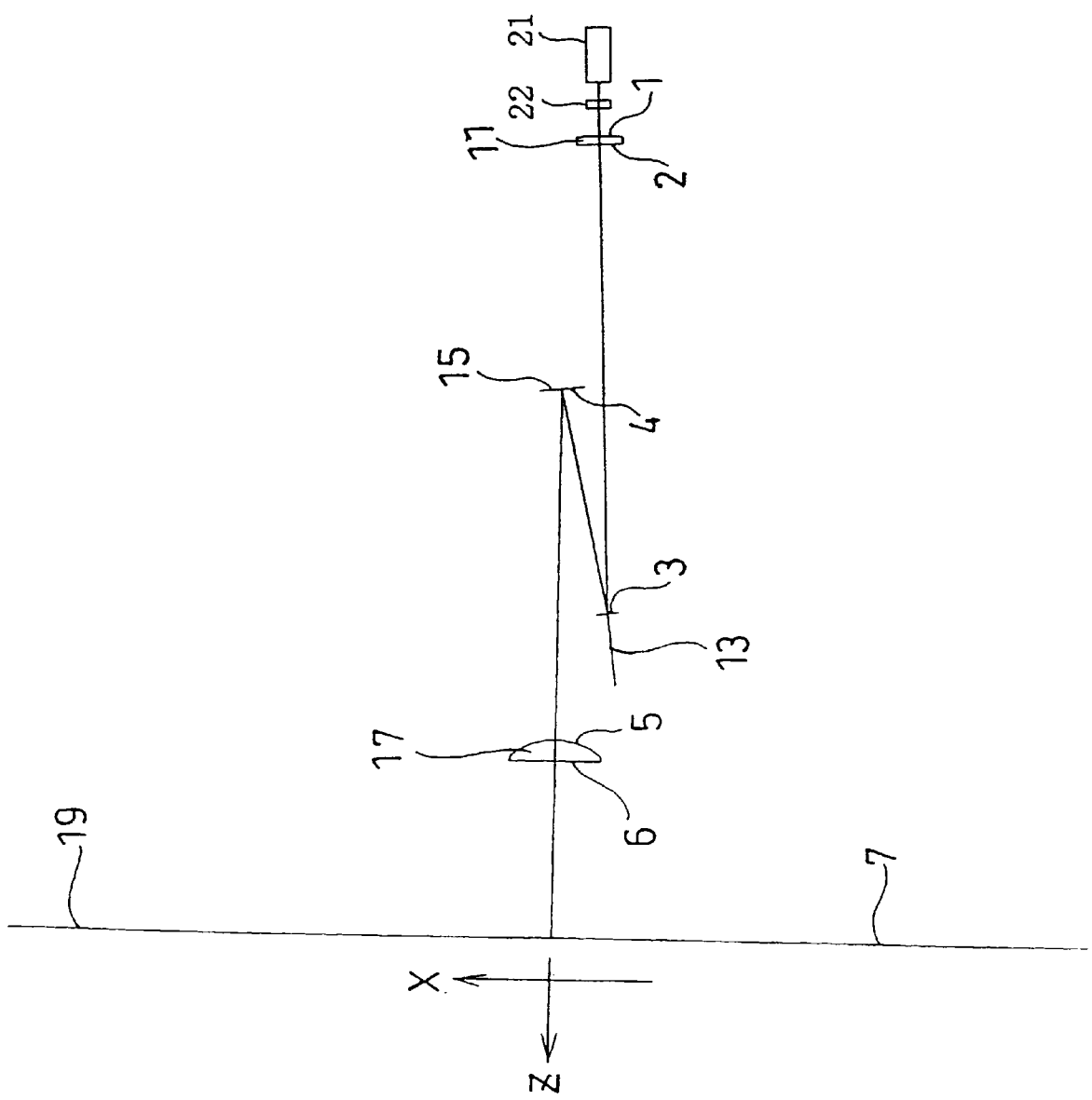
FIG. 26 is a diagram showing a reflection type optical scanning system of the seventh embodiment in the sub-scanning plane.
Figure 27B:
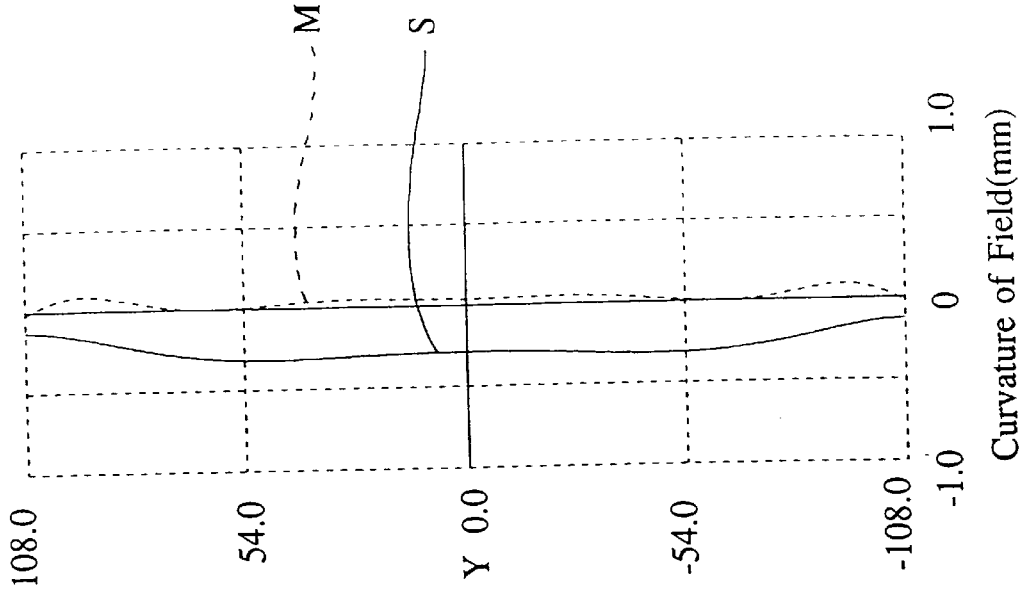
FIGS. 27A and 27B are graphs showing an fθ characteristic error of a scanning line and a curvature of the field, in the seventh embodiment, respectively.
Figure 27A:
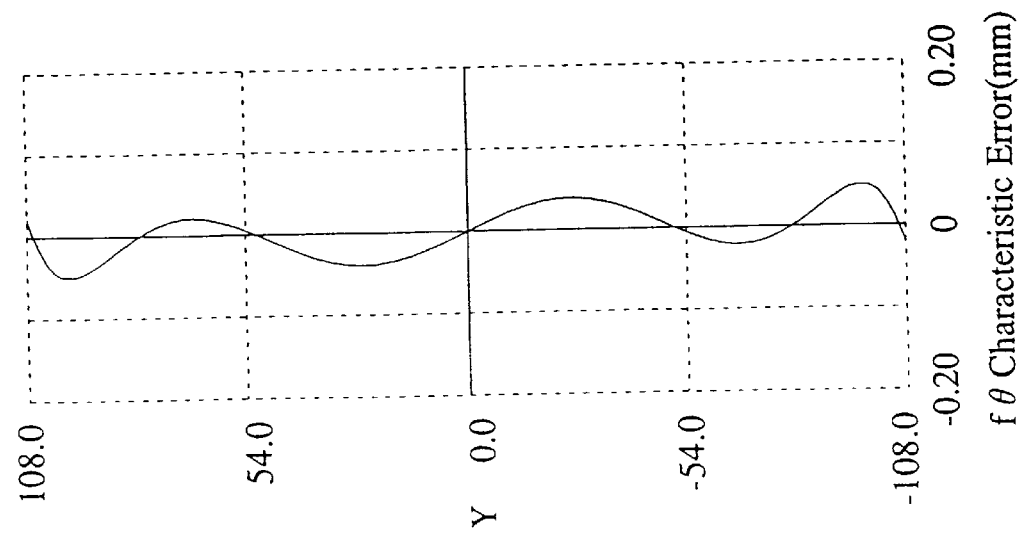
Figure 28A:
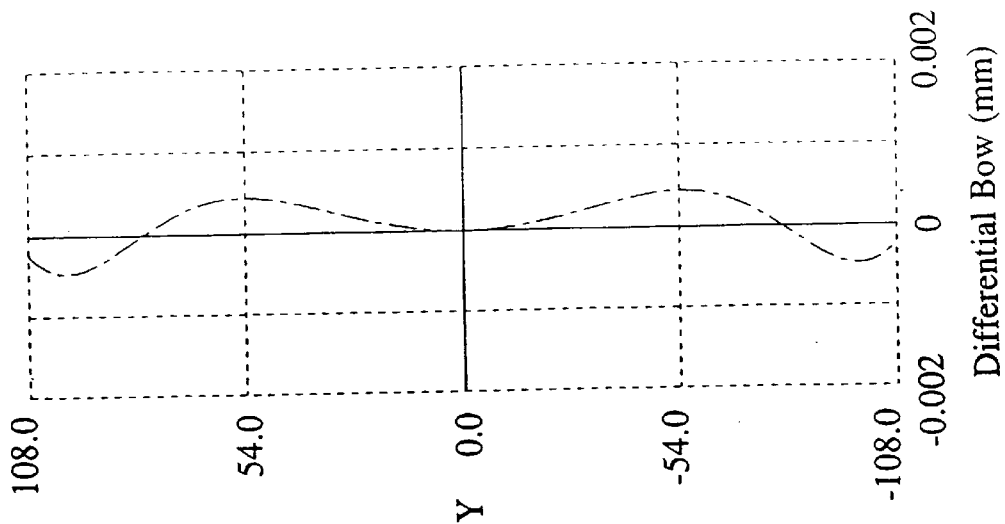
FIGS. 28A and 28B are graphs showing the variation of the f-number and a differential bow, in the seventh embodiment, respectively.
Figure 28B:
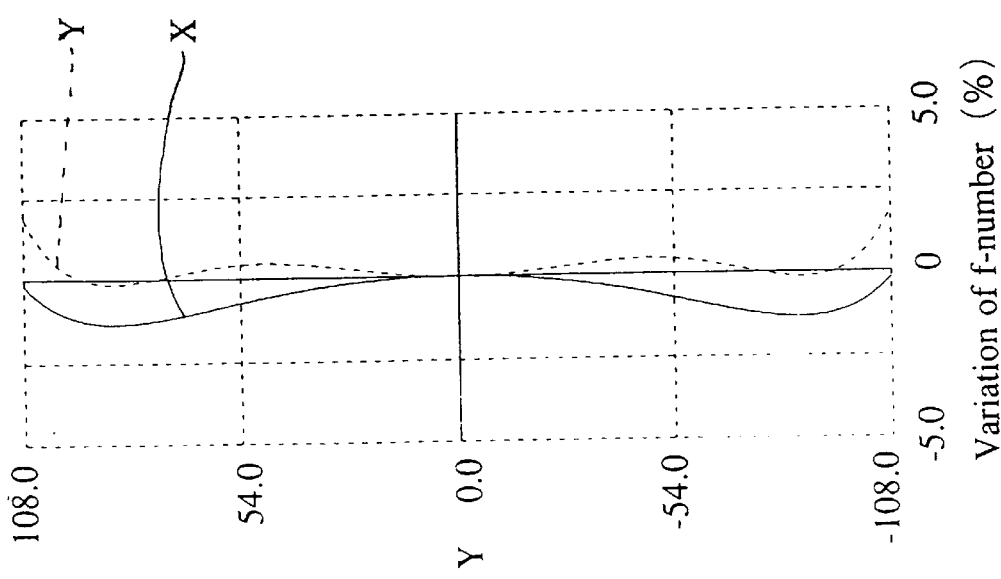

FIGS. 27A and 27B (which are comparable to FIGS. 23A and 23B) are graphs showing an fθ characteristic error of the scanning line and the field curvature in a reflection type optical scanning system as shown in FIGS. 25 and 26, the numerical data of which is shown in Table 7 below. FIGS. 28A and 28B (which are comparable to FIGS. 24A and 24B) show the variation of the f-number and the differential bow, respectively.

TABLE 7

| | K = 135.5 | W = 45.67° | Used Wavelength 780 nm | |
|---|---|---|---|---|
| No. | RY | RX | D | n(780 nm) |
| 1 | ∞ | 55.42 | 2.00 | 1.48617 |
| 2 | ∞ | — | 113.00 | |
| 3 | ∞ | — | 55.00 | (Polygon Mirror 13) |
| 4 | −255.70 | 350.00 | 84.00 | (Curved Mirror 15) |
| 5 | −967.00 | 16.00 | 5.00 | 1.48617 |
| 6 | 550.00 | — | | |

No.4: Deformed Barrel-Shaped Toroidal Surface
  k=−12.20
  $A2=-1.06\times10^{-5}$ $A4=-2.40\times10^{-8}$
  $AS2=1.00\times10^{-6}$ $AS4=-2.00\times10^{-10}$
No.5: Barrel-Shaped Toroidal Surface
  k=0.00
No.6: Rotationally symmetrical aspheric surface
  k=20.00
  $A4=-1.60\times10^{-7}$ $A6=1.66\times10^{-12}$
Incident angle on polygon mirror α=5.00°
Incident angle on curved mirror β=−6.00°
(Ce−Cc)/W=0.000027
$2Ze/h_y^2=-0.00102<-0.4$ (Ce−Cc)=−0.00050

Embodiment 8

Figure 29:
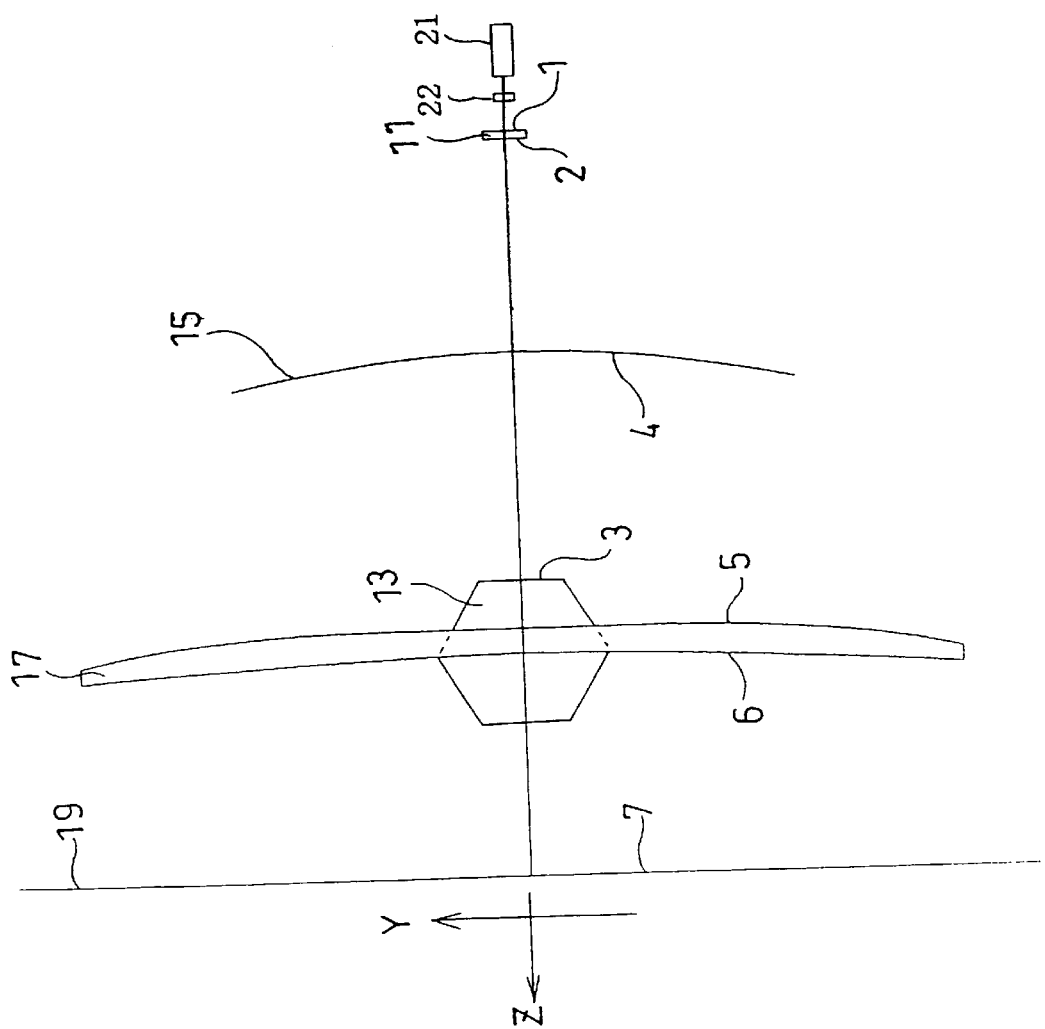
FIG. 29 is a diagram showing a reflection type optical scanning system of the eighth embodiment in the main scanning plane, according to the second aspect of the is present invention.
Figure 30:
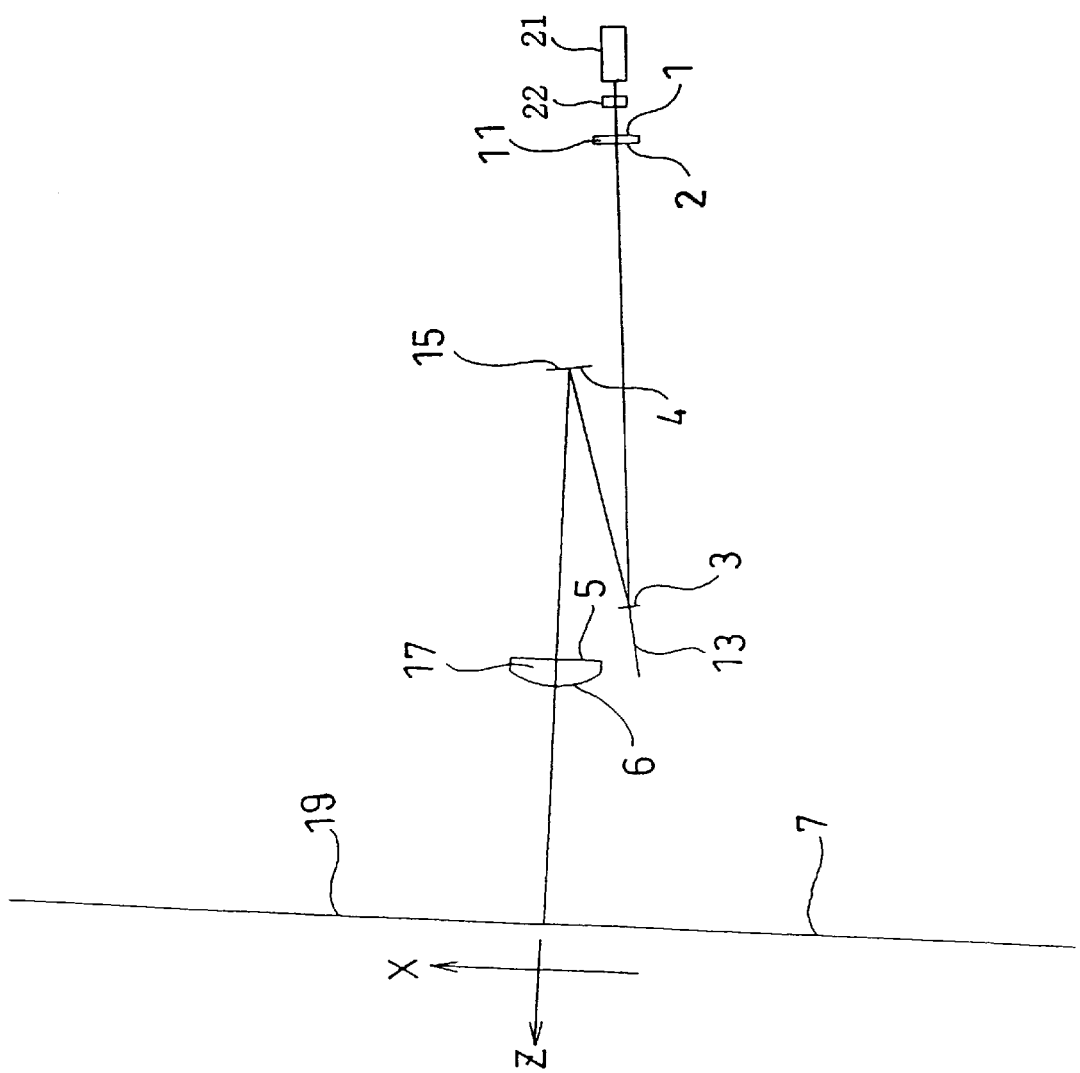
FIG. 30 is a diagram showing a reflection type optical scanning system of the eighth embodiment in the sub-scanning plane.
Figure 31A:
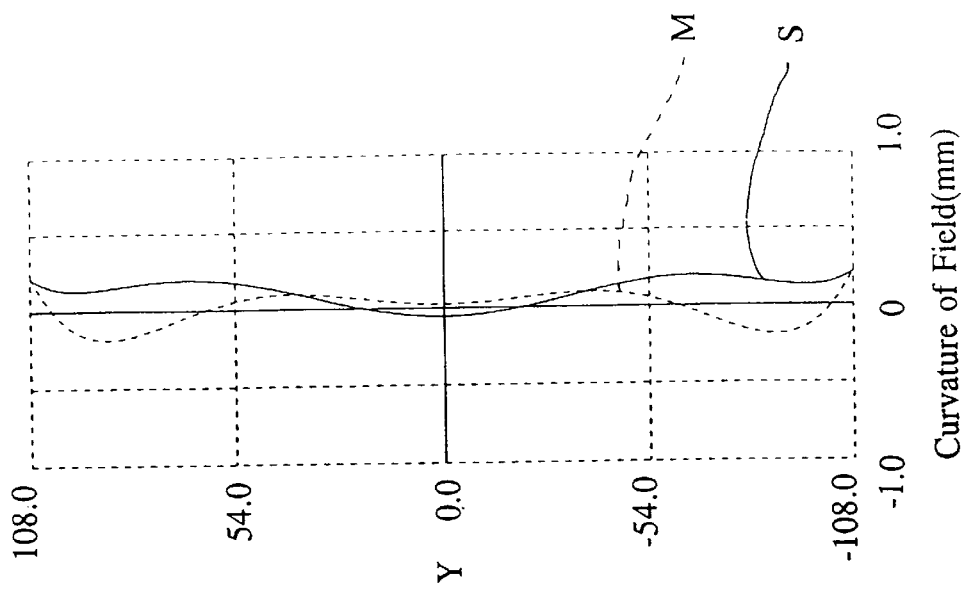
FIGS. 31A and 31B are graphs showing an fθ characteristic error of a scanning line and a curvature of the field, in the eighth embodiment, respectively.
Figure 31B:
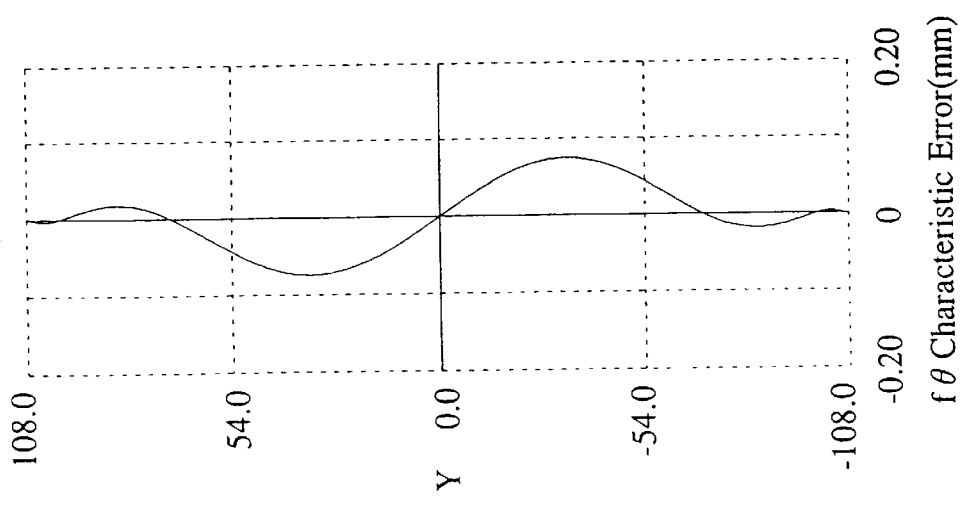
Figure 32A:
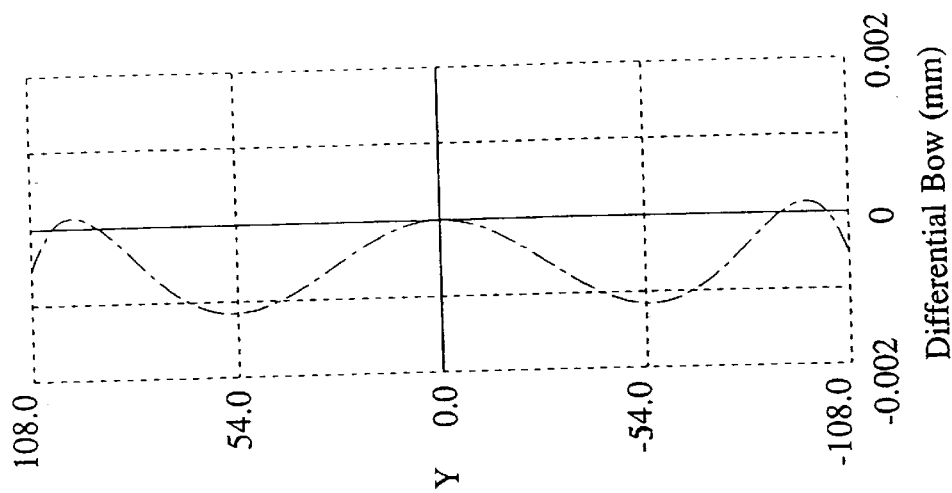
FIGS. 32A and 32B are graphs showing the variation of the f-number and a differential bow, in the eighth embodiment, respectively.
Figure 32B:
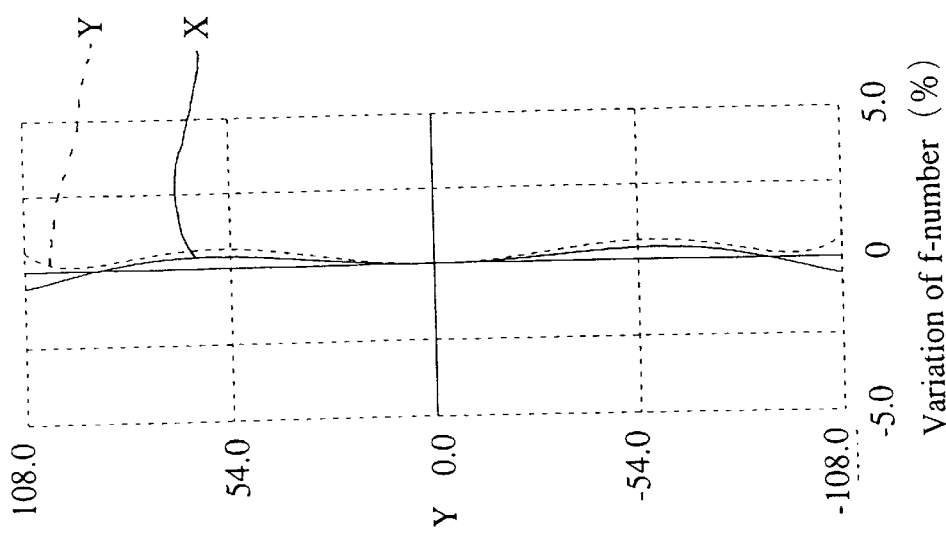

FIGS. 31A and 31B (which are comparable to FIGS. 23A and 23B) are graphs showing an fθ characteristic error of the scanning line and the field curvature in a reflection type optical scanning system as shown in FIGS. 29 and 30, the numerical data of which is shown in Table 8 below. FIGS. 32A and 32B (which are comparable to FIGS. 24A and 24B) show the variation of the f-number and the differential bow, respectively.

TABLE 8

| | K = 200.0 | W = 42.97° | Used Wavelength 780 nm | |
|---|---|---|---|---|
| No. | RY | RX | D | n(780 nm) |
| 1 | ∞ | 55.42 | 2.00 | 1.48617 |
| 2 | ∞ | — | 113.00 | |
| 3 | ∞ | — | 59.80 | (Polygon Mirror 13) |
| 4 | −261.50 | 168.40 | 70.80 | (Curved Mirror 15) |
| 5 | ∞ | — | 6.50 | 1.48617 |
| 6 | 737.00 | −18.40 | | |

No.4: Deformed Barrel-Shaped Toroidal Surface
  k=−11.00
  $A2=-1.80\times10^{-5}$ $A4=-2.16\times10^{-8}$
  $AS2=-5.80\times10^{-7}$ $AS4=-5.80\times10^{-12}$
No.5: Rotationally symmetrical aspheric surface
  k=0.00
  $A4=7.00\times10^{-8}$ $A6=-1.10\times10^{-12}$
No.6: Barrel-Shaped Toroidal Surface
  k=10.90
  $A4=-4.84\times10^{-8}$ $A6=2.10\times10^{-12}$
Incident angle on polygon mirror α=6.00°
Incident angle on curved mirror β=−8.00°
(Ce−Cc)/W=−0.000038
$2Ze/h_y^2=0.00091>-0.4$ (Ce−Cc)=0.00070

Embodiment 9

Figure 33:
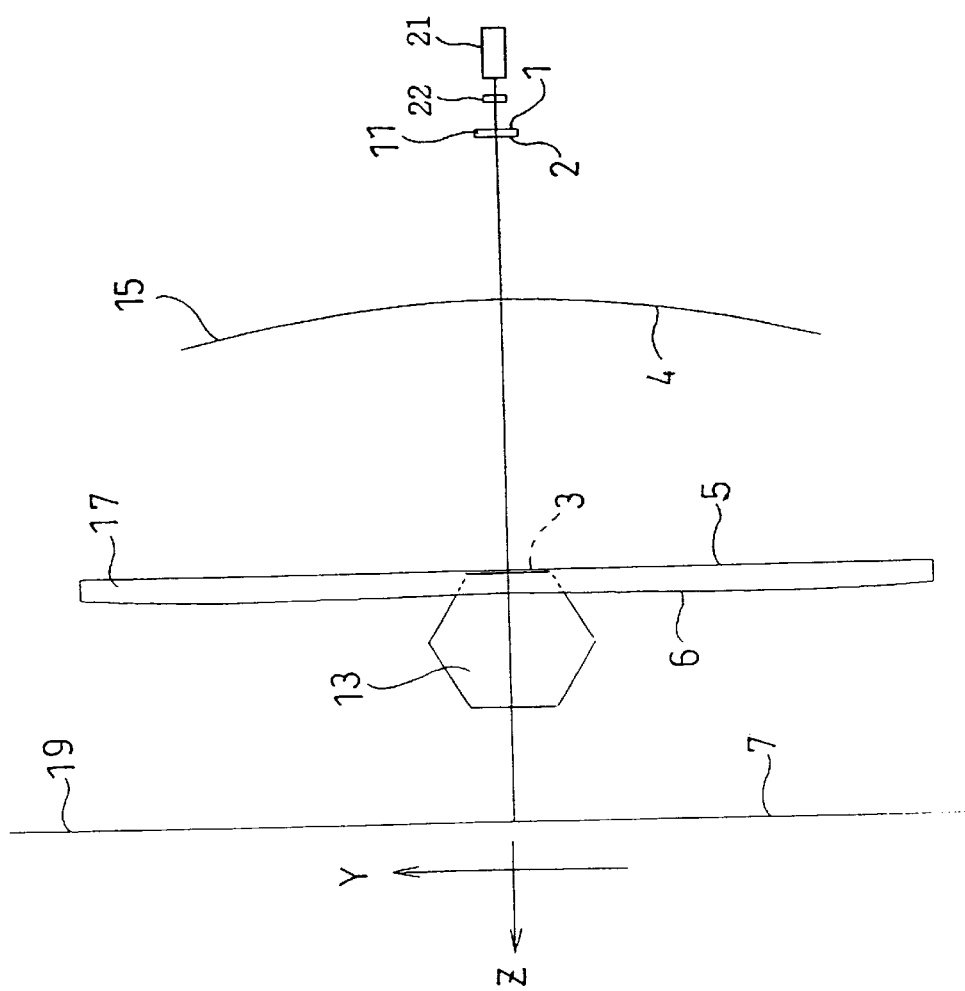
FIG. 33 is a diagram showing a reflection type optical scanning system of the ninth embodiment in the main scanning plane, according to the second aspect of the present invention.
Figure 35A:
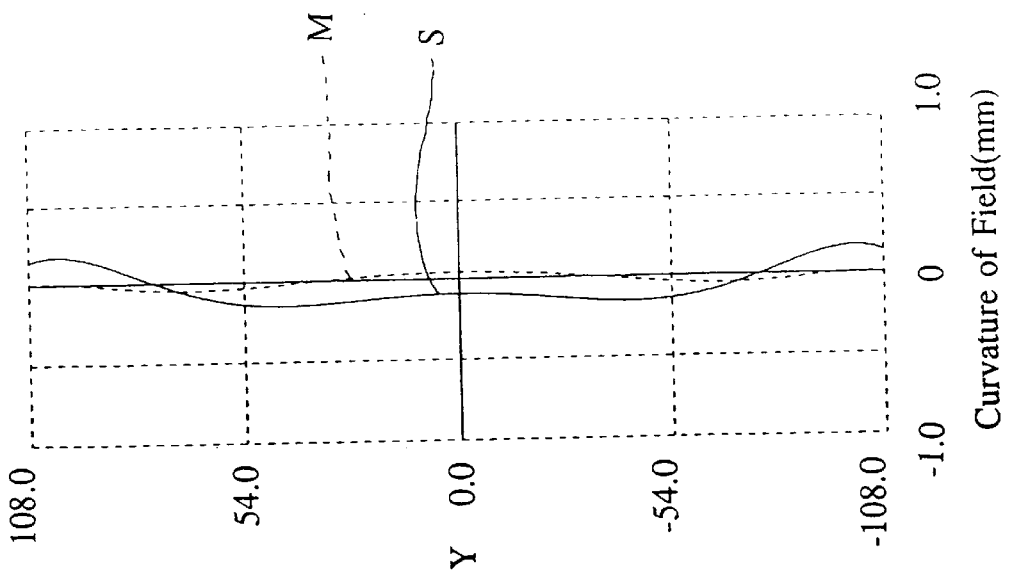
FIGS. 35A and 35B are graphs showing an fθ characteristic error of a scanning line and a curvature of the field, in the ninth embodiment, respectively; and, FIGS. 36A and 36B are graphs showing the variation of the f-number and a differential bow, in the ninth embodiment, respectively.
Figure 35B:
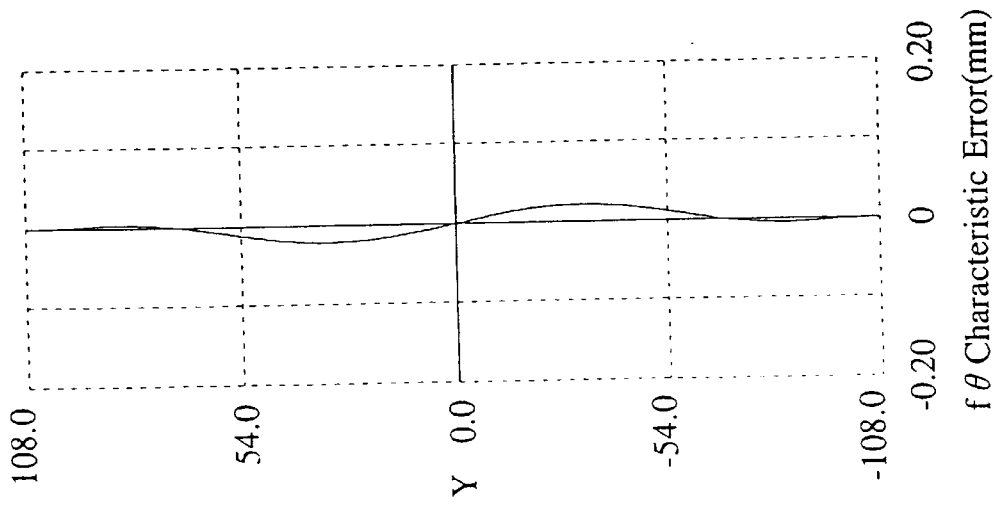
Figure 36A:
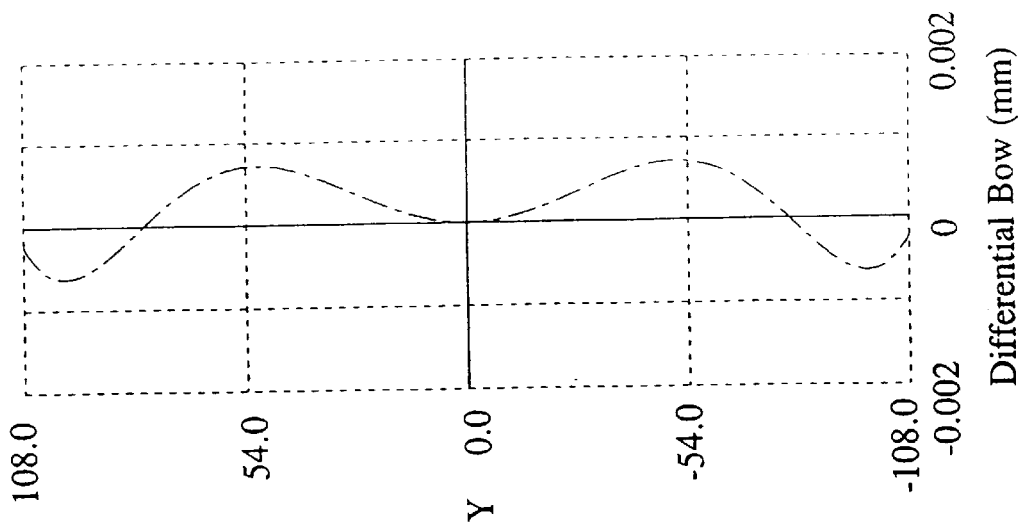
Figure 36B:
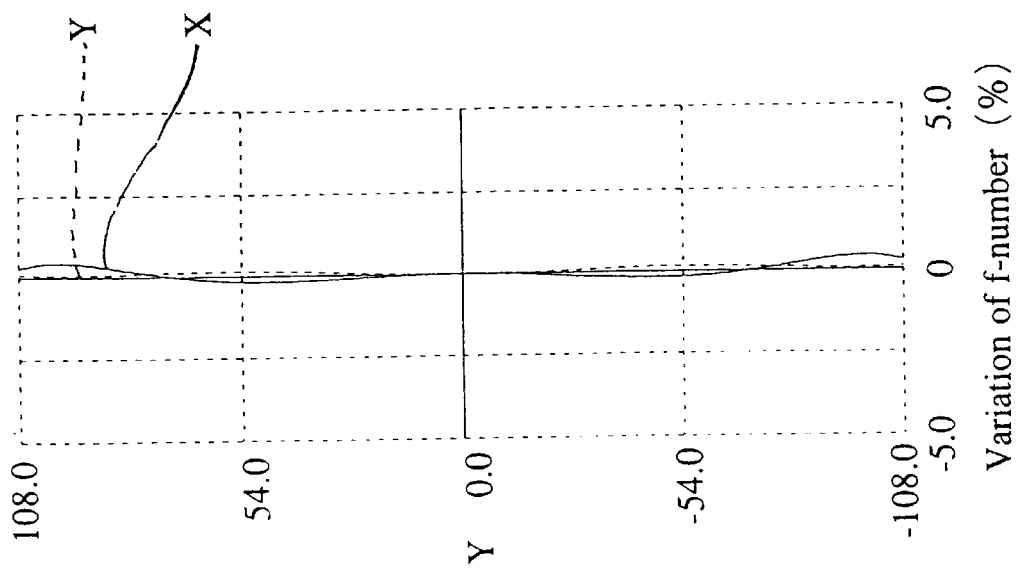
Figure 40:
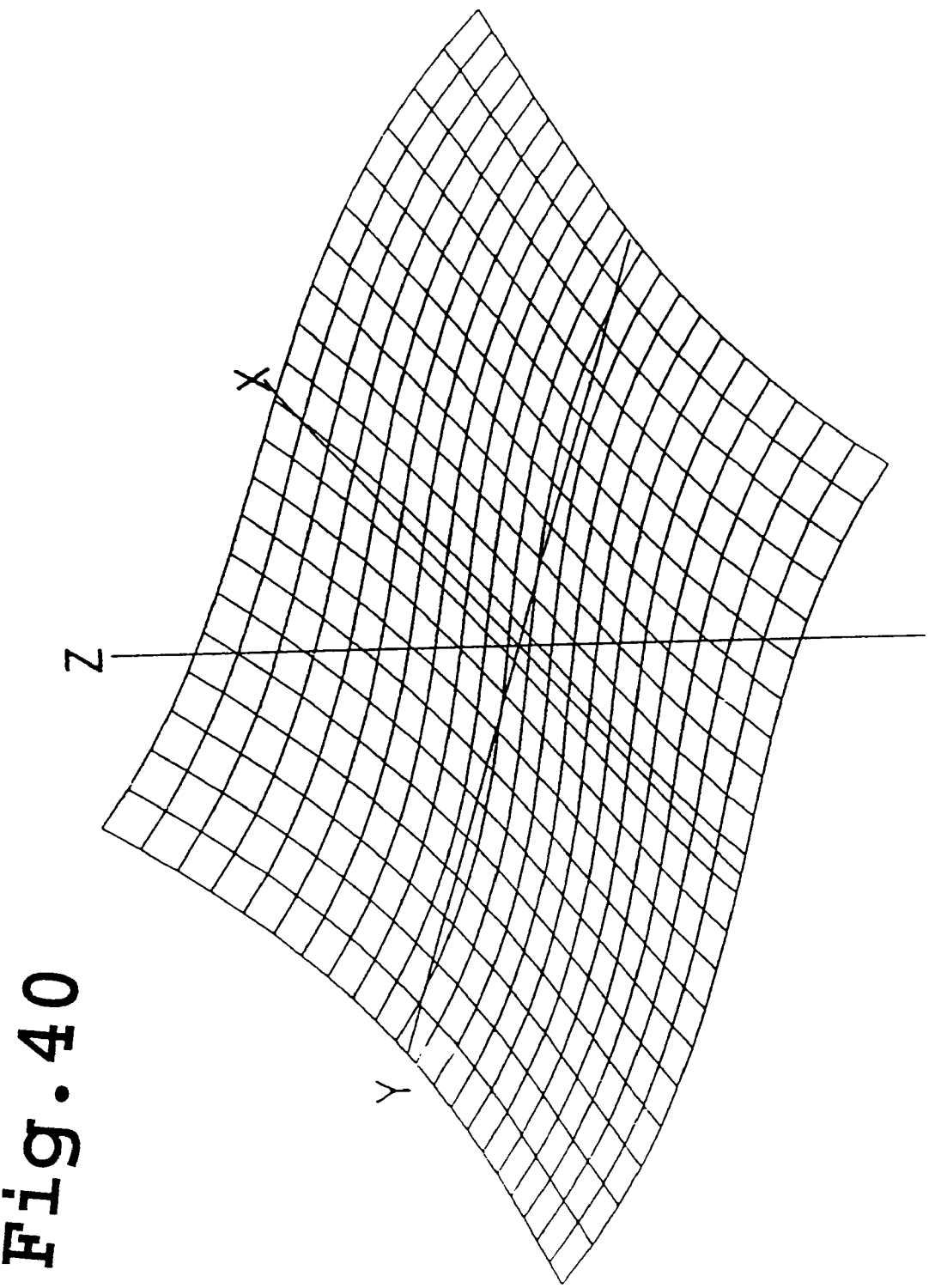
FIG. 40 is diagram showing the wave surface of the rays which travel toward the end portion of the object surface, in the ninth embodiment according to the present invention.

FIGS. 35A and 35B (which are comparable to FIGS. 23A and 23B) are graphs showing an fθ characteristic error of the scanning line and the field curvature in a reflection type optical scanning system as shown in FIGS. 33 and 34, the numerical data of which is shown in Table 9 below. FIGS. 36A and 36B (which are comparable to FIGS. 24A and 24B) show the variation of the f-number and the differential bow, respectively. The wave surface of the rays which travel toward the end portion of the object surface of the ninth embodiment is shown in FIG. 40.

TABLE 9

| | K = 135.5 | W = 45.67° | Used Wavelength 780 nm | |
|---|---|---|---|---|
| No. | RY | RX | D | n(780 nm) |
| 1 | ∞ | 55.42 | 2.00 | 1.48617 |
| 2 | ∞ | — | 113.00 | |
| 3 | ∞ | — | 72.00 | (Polygon Mirror 13) |
| 4 | −265.90 | 263.60 | 70.40 | (Curved Mirror 15) |
| 5 | ∞ | — | 6.00 | 1.48617 |
| 6 | 1530.00 | −20.0 | | |

No.4: Deformed Barrel-Shaped Toroidal Surface
  k=−6.15
  $A2=-1.40\times10^{-5}$ $A4=-1.62\times10^{-8}$ $A6=-1.09\times10^{-14}$
  $AS2=-2.20\times10^{-7}$ $AS4=4.05\times10^{-11}$
No.6: Deformed Barrel-Shaped Toroidal Surface
  k=−26.00
  $A2=8.90\times10^{-5}$ $A4=-5.65\times10^{-8}$ $A6=1.50\times10^{-12}$
  $AS2=8.45\times10^{-7}$ $AS4=-3.60\times10^{-11}$
Incident angle on polygon mirror α=5.00°
Incident angle on curved mirror β=−6.00°
(Ce−Cc)/W=−0.000005

As can be seen from the above discussion, in a reflection type optical scanning system according to a second aspect of the present invention, since the curved mirror 15 is made of an anamorphic surface which concave in the main scanning plane with respect to the incident light and convex in the sub-scanning plane is used, the distortion of the wavefront which is a serious problem upon a wide angle scanning can be eliminated without deviating the anamorphic lens 17.

What is claimed is:

1. A reflection type optical scanning system comprising:
   a cylindrical lens having positive power in the sub-scanning direction;
   a deflector;
   a curved reflection mirror; and
   an anamorphic lens which is provided between said curved reflection mirror and an object surface to be scanned and which is provided with at least one toroidal surface having positive power in said sub-scanning direction; along a light path in this order from a light source side, wherein:
   said deflector is arranged so that light emitted from said cylindrical lens is made incident thereupon at a predetermined incident angle in said sub-scanning direction;
   said curved reflection mirror constitutes a barrel-shaped toroidal surface, the shape thereof in a main scanning direction perpendicular to said sub-scanning direction being concave and the shape thereof in the sub-scanning direction being an arc, wherein the centers of curvature of said arc follow a curved locus;
   said curved reflection mirror is inclined so that said light incident thereupon from said deflector is reflected by said curved reflection mirror at a predetermined angle in said sub-scanning direction toward said object surface to be scanned.

2. A reflection type optical scanning system according to claim 1, wherein the axis of said anamorphic lens is deviated from the optical axis of said optical scanning system in said sub-scanning direction.

3. A reflection type optical scanning system according to claim 1, wherein the following formula (1) is satisfied:

$$-0.0002 < (Ce-Cc)/W < 0.0001 \tag{1}$$

wherein Cc and Ce (mm$^{-1}$) represent the curvatures, in said sub-scanning direction, of said curved reflection mirror at a position where the light rays travelling toward the center and the ends of said object surface to be scanned are incident upon said curved reflection mirror, respectively, and W represents the half angle of view (°).

4. A reflection type optical scanning system according to claim 3, wherein the surface of said anamorphic lens located adjacent said curved reflection mirror is defined by a toroidal surface having positive power in said sub-scanning direction; and wherein the following formula (2) is satisfied:

$$2Ze/h_y^2 < -0.4(Ce-Cc) \tag{2}$$

and $$0 < (Ce-Cc)/W$$

wherein $h_y$ (mm) represents said image height in said main scanning direction at a position at which said light travelling toward said end of said object surface to be scanned is made incident upon said at least one toroidal surface of said anamorphic lens, and Ze (mm) represents the amount of sag of said at least one toroidal surface of said anamorphic lens, respectively.

5. A reflection type optical scanning system according to claim 3, wherein said surface of said anamorphic lens located adjacent said object surface to be scanned is defined by a toroidal surface which has positive power in said sub-scanning direction; and wherein the following formula (3) is satisfied:

$$2Ze/h_y^2 > -0.4(Ce-Cc)d \tag{3}$$

$$0 > (Ce-Cc)/W$$

wherein $h_y$ (mm) represents said image height in said main scanning direction at a position at which said light toward said end of said object surface to be scanned is made incident upon said toroidal surface, which has positive power in the sub-scanning direction, of said anamorphic lens, and Ze (mm) represents the amount of sag of said toroidal surface, respectively.

6. A reflection type optical scanning system according to claim 1, wherein at least one surface of said anamorphic lens is defined by a deformed barrel-shaped toroidal surface whose centers of curvature in said sub-scanning direction follow a curved locus.

7. A reflection type optical scanning system comprising:
a cylindrical lens having positive power in a sub-scanning direction;
a deflector;
a curved reflection mirror; and
an anamorphic lens which is provided with at least one toroidal surface having positive power in said sub-scanning direction; along a light path in this order from the light source side, wherein:
said deflector is arranged so that light incident thereupon has a predetermined incident angle in said sub-scanning direction;
said curved reflection mirror having an anamorphic reflection surface which is concave, in a main scanning direction perpendicular to said sub-scanning direction and convex in the sub-scanning direction, with respect to the incident light, said curved reflection mirror being inclined so that said light incident thereupon from said deflector is reflected by said curved reflection mirror at a predetermined angle in said sub-scanning direction toward an object surface to be scanned;
said anamorphic lens is arranged without being deviated from the optical axis of said optical scanning system in said sub-scanning direction.

8. A reflection type optical scanning system according to claim 7, wherein said anamorphic surface of said curved reflection mirror is a barrel-shaped toroidal surface which has a rotational axis parallel to the main scanning direction.

9. A reflection type optical scanning system according to claim 7, wherein said anamorphic surface of said curved reflection mirror comprises a deformed barrel-shaped toroidal surface of which the centers of the curvature thereof in said sub-scanning direction follow a curved locus.

10. A reflection type optical scanning system according to claim 7, wherein the following formula (4) is satisfied:

$$-0.0002 < (Ce-Cc)/W < 0.0001 \tag{4}$$

wherein Cc and Ce (mm$^{-1}$) represent the curvatures, in said sub-scanning direction, of said curved reflection mirror at a position where the light rays travelling toward the center and the ends of said object surface to be scanned are incident upon said curved reflection mirror, respectively, and W represents the half angle of view (°).

11. A reflection type optical scanning system according to claim 10, wherein the surface on the curved reflection mirror side of said anamorphic lens is a toroidal surface having positive power in the sub-scanning direction; and wherein the following formula (5) is satisfied:

$$2Ze/h_y^2 < -0.4(Ce-Cc) \tag{5}$$

$$0 < (Ce-Cc)/W$$

wherein $h_y$ (mm) represents said image height in said main scanning direction at a position at which said light toward said end of said object surface to be scanned is made incident upon said toroidal surface of said anamorphic lens, and Ze (mm) represents the amount of sag of said toroidal surface, respectively.

12. A reflection type optical scanning system according to claim 10, wherein the surface on the object surface side of said anamorphic lens is a toroidal surface having positive power in the sub-scanning direction; and wherein it satisfies said following formula (6):

$$2Ze/h_y^2 > -0.4(Ce-Cc) \tag{6}$$

$$0 > (Ce-Cc)/W$$

wherein $h_y$ (mm) represents said image height in said main scanning direction at a position at which said light toward said end of said object surface to be scanned is made incident upon said toroidal surface of said anamorphic lens, and Ze (mm) represents the amount of sag of said toroidal surface, respectively.

13. A reflection type optical scanning system according to claim 7, wherein at least one surface of said anamorphic lens is defined by a deformed barrel-shaped toroidal surface whose center of curvature in said sub-scanning direction follow a curved locus.

14. The system of claim 1, in which the barrel-shaped toroidal surface has a center of curvature in the sub-scanning direction that varies according to the image height in the main scanning direction.

* * * * *